United States Patent
Soubaras

(10) Patent No.: US 10,459,099 B2
(45) Date of Patent: Oct. 29, 2019

(54) DEVICE AND METHOD TO DETERMINE SHAPE OF STREAMER

(75) Inventor: Robert Soubaras, Orsay (FR)

(73) Assignee: CGG SERVICES SAS, Massy (FR)

(*) Notice: Subject to any disclaimer, the term of this patent is extended or adjusted under 35 U.S.C. 154(b) by 1992 days.

(21) Appl. No.: 13/606,601

(22) Filed: Sep. 7, 2012

(65) Prior Publication Data

US 2013/0077436 A1 Mar. 28, 2013

Related U.S. Application Data

(60) Provisional application No. 61/537,879, filed on Sep. 22, 2011.

(51) Int. Cl.
*G01V 1/38* (2006.01)

(52) U.S. Cl.
CPC ................ *G01V 1/3808* (2013.01)

(58) Field of Classification Search
CPC .......... G01V 1/36; G01V 1/38; G01V 1/3808; G01V 2210/56
USPC .......................................................... 367/19
See application file for complete search history.

(56) References Cited

U.S. PATENT DOCUMENTS

| | | | |
|---|---|---|---|
| 4,353,121 A | 10/1982 | Ray et al. | |
| 4,992,992 A | 2/1991 | Dragoset, Jr. | |
| 7,400,552 B2 | 7/2008 | Moldoveanu et al. | |
| 7,660,191 B2 | 2/2010 | Robertsson | |
| 7,797,110 B2 | 9/2010 | Shin | |
| 7,817,495 B2 | 10/2010 | Ozbek et al. | |
| 7,835,224 B2 | 11/2010 | Robertsson et al. | |
| 8,531,912 B2 | 9/2013 | Soubaras | |
| 8,588,025 B2 | 11/2013 | Moldoveanu et al. | |
| 8,693,281 B2 | 4/2014 | Kragh et al. | |
| 8,737,163 B2 | 5/2014 | Garden | |
| 2002/0082811 A1* | 6/2002 | Honjas et al. | 703/2 |
| 2002/0087272 A1* | 7/2002 | Mackie | 702/14 |
| 2002/0180732 A1* | 12/2002 | Docherty | 345/424 |
| 2004/0172199 A1* | 9/2004 | Chavarria et al. | 702/14 |
| 2009/0006000 A1* | 1/2009 | Shin | 702/17 |

(Continued)

FOREIGN PATENT DOCUMENTS

| | | |
|---|---|---|
| AU | 2012227325 B2 | 4/2013 |
| CN | 101008677 A | 8/2007 |

(Continued)

OTHER PUBLICATIONS

PCT International Search Report in related International Application No. PCT/EP2012/068654, dated Aug. 2, 2013.

(Continued)

*Primary Examiner* — Isam A Alsomiri
*Assistant Examiner* — Amie M Ndure
(74) *Attorney, Agent, or Firm* — Patent Portfolio Builders PLLC

(57) ABSTRACT

A method for determining a shape of a streamer to be towed under water for collecting seismic data. The method includes receiving a velocity model for the subsurface; selecting a first profile for a streamer to be used to survey the subsurface; calculating ghosts and/or residual ghosts and/or residual ghost spectra for a plurality of reflectors of the subsurface; and determining that the first profile is appropriate for surveying the subsurface when at least one criterion, related to the ghosts, residual ghosts and/or residual ghost spectra is met.

23 Claims, 32 Drawing Sheets

(56) References Cited

U.S. PATENT DOCUMENTS

| | | | |
|---|---|---|---|
| 2009/0037114 A1* | 2/2009 | Peng et al. ............... | 702/14 |
| 2010/0002536 A1 | 1/2010 | Brewer et al. | |
| 2010/0305109 A1 | 12/2010 | Scanio et al. | |
| 2011/0176384 A1 | 7/2011 | Soubaras | |
| 2011/0305109 A1* | 12/2011 | Soubaras ............ | G01V 1/28 367/24 |
| 2012/0092956 A1 | 4/2012 | Soubaras | |
| 2012/0213033 A1 | 8/2012 | Soubaras | |
| 2012/0218858 A1 | 8/2012 | Soubaras | |
| 2012/0224454 A1* | 9/2012 | Soubaras ............ | G01V 1/3826 367/17 |

FOREIGN PATENT DOCUMENTS

| | | |
|---|---|---|
| CN | 101253420 A | 8/2008 |
| CN | 101652678 A | 2/2010 |
| CN | 101680961 A | 3/2010 |
| CN | 101688926 A | 3/2010 |
| CN | 102027390 A | 4/2011 |
| CN | 102047146 A | 5/2011 |
| FR | 2955397 A1 | 7/2011 |
| GB | 2477031 A | 7/2011 |
| WO | 9428439 A1 | 12/1994 |
| WO | 9815849 A1 | 4/1998 |
| WO | 2007/006785 A2 | 1/2007 |
| WO | 2009/158205 A2 | 12/2009 |
| WO | 2011/057324 A1 | 5/2011 |
| WO | 2011/082308 A2 | 7/2011 |
| WO | 2011/086166 A1 | 7/2011 |
| WO | 2011/103081 A2 | 8/2011 |

OTHER PUBLICATIONS

Extended European Search Report in related European Application No. 12185481, dated Aug. 9, 2013.
Hungarian Search and Examination Report dated Nov. 14, 2013, in related Singapore Patent Application No. 201206982-9.
Chinese Office Action in corresponding Chinese Application No. 201210359445.X dated Jun. 3, 2016. (Reference D1 was submitted with Information Disclosure Statement on Dec. 16, 2015.).
Chinese Office Action in corresponding Chinese Application No. 201210359445.X dated Dec. 2, 2015.
Office Action in corresponding Indonesian Application No. P00201200755 dated Mar. 17, 2017. (All references previously made of record in an Information Disclosure Statement submitted on Aug. 28, 2013.).
Office Action in corresponding Canadian Application No. 2,755,010 dated Mar. 24, 2017. (Reference D1 was previously made of record in an Information Disclosure Statement submitted on Dec. 16, 2015. Reference D3 was previoulsy made on record in an Information Disclosure Statement submitted on Aug. 28, 2013.).
Examination Report in corresponding India Application No. 2909/DEL/2012 dated Feb. 22, 2018. (All references not cited herewith have been previously made of record.).
Office Action in European Application No. 12 185 481.4 dated Aug. 1, 2018.

* cited by examiner

DEVICE AND METHOD TO DETERMINE SHAPE OF STREAMER

CROSS REFERENCE TO RELATED APPLICATIONS

The present application is related to U.S. Provisional Application 61/392,982, entitled, "Method and Device to Acquire Seismic Data," authored by R. Soubaras, the entire content of which is incorporated herein by reference.

BACKGROUND

Technical Field

Embodiments of the subject matter disclosed herein generally relate to methods and systems and, more particularly, to mechanisms and techniques for determining a profile of a streamer to be used in a marine seismic survey.

Discussion of the Background

Marine seismic data acquisition and processing generate a profile (image) of the geophysical structure (subsurface) under the seafloor. While this profile does not provide an accurate location for oil and gas deposits, it suggests, to those trained in the field, the presence or absence of such deposits. Thus, providing a high-quality image of the subsurface is an ongoing process for the exploration of natural resources.

During a seismic gathering process, as shown in FIG. 1, a vessel 10 tows an array of acoustic detectors 12, which are distributed along a body 14. The body 14 and its corresponding detectors 12 are sometimes referred to, by those skilled in the art, as a streamer 16. The vessel 10 may tow plural streamers 16 at the same time. The streamers may be positioned horizontally, i.e., lying at a constant depth $z_1$ relative to the ocean surface 18. Also, the plural streamers 16 may form a constant angle (i.e., the streamers may be slanted) with respect to the ocean surface as disclosed in U.S. Pat. No. 4,992,992, the entire content of which is incorporated herein by reference. FIG. 2 shows such a configuration in which all detectors 12 are distributed along a slanted straight body 14, making a constant angle α with reference horizontal line 30.

With reference to FIG. 1, the vessel 10 may also tow a sound source 20 configured to generate an acoustic wave 22a. The acoustic wave 22a propagates downward and penetrates the seafloor 24, eventually being reflected by a reflecting structure 26 (reflector R). The reflected acoustic wave 22b propagates upward and may be detected by detector 12. For simplicity, FIG. 1 shows only two paths 22a corresponding to the acoustic wave. However, the acoustic wave emitted by the source 20 may be substantially a spherical wave, e.g., it propagates in all directions starting from the source 20. Parts of the reflected acoustic wave 22b (primary) are recorded by the various detectors 12 (the recorded signals are called traces) while parts of the reflected wave 22c pass the detectors 12 and arrive at the water's surface 18. Since the interface between the water and air is well approximated as a quasi-perfect reflector (i.e., the water's surface acts as a mirror for the acoustic waves), the reflected wave 22c travels back toward the detector 12 as shown by wave 22d in FIG. 1. Wave 22d is normally referred to as a ghost wave because it is caused by a spurious reflection. The ghosts are also recorded by the detector 12, but with a reverse polarity and a time lag relative to the primary wave 22b. The degenerative effect that ghost waves have on bandwidth and resolution of seismic measurements is known. In essence, interference between primary and ghost arrivals causes, among other problems, notches, or gaps, in the frequency content of the data recorded by the detectors.

The traces may be used to determine the subsurface (i.e., earth structure below surface 24) and to determine the position and presence of reflectors 26. However, the ghosts disturb the accuracy of the final image of the subsurface, and for at least this reason, various methods exist for removing the ghosts, i.e., deghosting, from the results of a seismic analysis.

The streamer configuration illustrated in FIG. 2 is considered to provide a clearer image of the subsurface than the configuration illustrated in FIG. 1. One reason for this difference is that for each reflector, the time gap between detection of the primary and ghost reflections becomes greater the further the detector 12 is from the source 20, due to the detectors' slanted disposition, thus facilitating deghosting.

However, the slanted streamer shown in FIG. 2 has the following limitation, which makes it impractical. Current streamers have a typical length of about 6 to 10 km. Using a slanted streamer as suggested in U.S. Pat. No. 4,992,992, e.g., with a slope of 2 percent (i.e., 0.02) relative to the horizontal line 30, would lead to a depth of about 280 m for the last detector, while in reality current marine detectors are designed to operate in water depths up to about 50 m. Thus, for current streamers, the approach proposed in the '992 patent would require detectors to be located in water depths beyond their current capabilities, resulting in detectors' failure or making it impossible to deploy detectors at those depths.

The effect of ghosts on the frequency spectrum is known in the art and has been discussed, for example, in provisional Patent Application No. 61/392,982, entitled, "Method and Device to Acquire Seismic Data," authored by R. Soubaras, the same inventor as this patent application.

Thus, it is desirable to perform data acquisition using a broad bandwidth of frequencies to reduce ghosts. The broad bandwidth is understood to include low frequencies (e.g., 0 to 32 Hz) and high frequencies (e.g., 68 to 132 Hz). Broad bandwidth is desirable because it produces sharper wavelets for better resolution of important features such as thin beds and stratigraphic traps. Low frequencies provide better penetration for deep targets, as well as better stability for inversion.

At least two octaves of signal are required for seismic imaging, and more are better. An effect of increasing the low-frequency content of collected seismic data is to decrease the side lobes of the wavelet, thus making a more accurate interpretation. Increasing the high-frequency content sharpens the central peak of the wavelet, yet still leaves reverberating side lobes, making precise interpretation difficult. The sharpest wavelets, and therefore the best resolution, are produced by extending the bandwidth in both the low- and high-frequency directions. It is possible now to record a full six octaves of signal by using BroadSeis equipment and algorithms (as developed by CGGVeritas, Massy, France). The BroadSeis equipment includes curved streamers and/or other variable-depth streamers as disclosed in patent application Ser. No. 13/272,428, "Method and Device to Acquire Seismic Data," authored by R. Soubaras, the entire content of which is included herein by reference.

As can be seen from the above discussion, there is a need to provide a method for performing a marine seismic survey in which the contribution of the ghost may be eliminated or separated from the contribution of the primary to improve the quality of a subsurface image. The BroadSeis method uses a variable-depth streamer; however, the streamer's shape may vary with the purpose of the seismic survey and the structure of the subsurface to be surveyed. Accordingly, it would be desirable to provide systems and methods that determine the shape of the streamer for a given subsurface.

SUMMARY

According to an exemplary embodiment, there is a method for determining a shape of a streamer to be towed underwater for collecting seismic data regarding a subsurface. The method includes a step of receiving a velocity model for the subsurface; a step of selecting a first profile for the streamer to be used to survey the subsurface; a step of selecting plural reflectors of the subsurface; a step of calculating ghosts and/or residual ghosts and/or residual ghost spectra for the plurality of the reflectors; and a step of determining that the first profile is appropriate for surveying the subsurface when at least one criterion, related to the ghosts, and/or the residual ghosts and/or the residual ghost spectra, is met.

According to another exemplary embodiment, there is a computing device programmed for determining a shape of a streamer to be towed underwater for collecting seismic data regarding a subsurface. The computing device includes an interface configured to receive a velocity model for the subsurface; and a processor connected to the interface. The processor is configured to, select a first profile for the streamer to be used to survey the subsurface, select plural reflectors of the subsurface, calculate ghosts and/or residual ghosts and/or residual ghost spectra for the plurality of the reflectors, and determine that the first profile is appropriate for surveying the subsurface when at least one criterion, related to the ghosts, and/or the residual ghosts and/or the residual ghost spectra, is met.

According to still another exemplary embodiment, there is an article comprising at least one computer-readable storage medium containing instructions that when executed causes a computer to receive a velocity model for the subsurface; select a first profile for the streamer to be used to survey the subsurface; select plural reflectors of the subsurface; calculate ghosts and/or residual ghosts and/or residual ghost spectra for the plurality of the reflectors; and determine that the first profile is appropriate for surveying the subsurface when at least one criterion, related to the ghosts, and/or the residual ghosts and/or the residual ghost spectra, is met.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a streamer having a variable-depth profile, at least for a first part. However, the embodiments to be discussed next are not limited to these structures, but may be applied to other structures that have detectors provided at variable-depths.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 3:
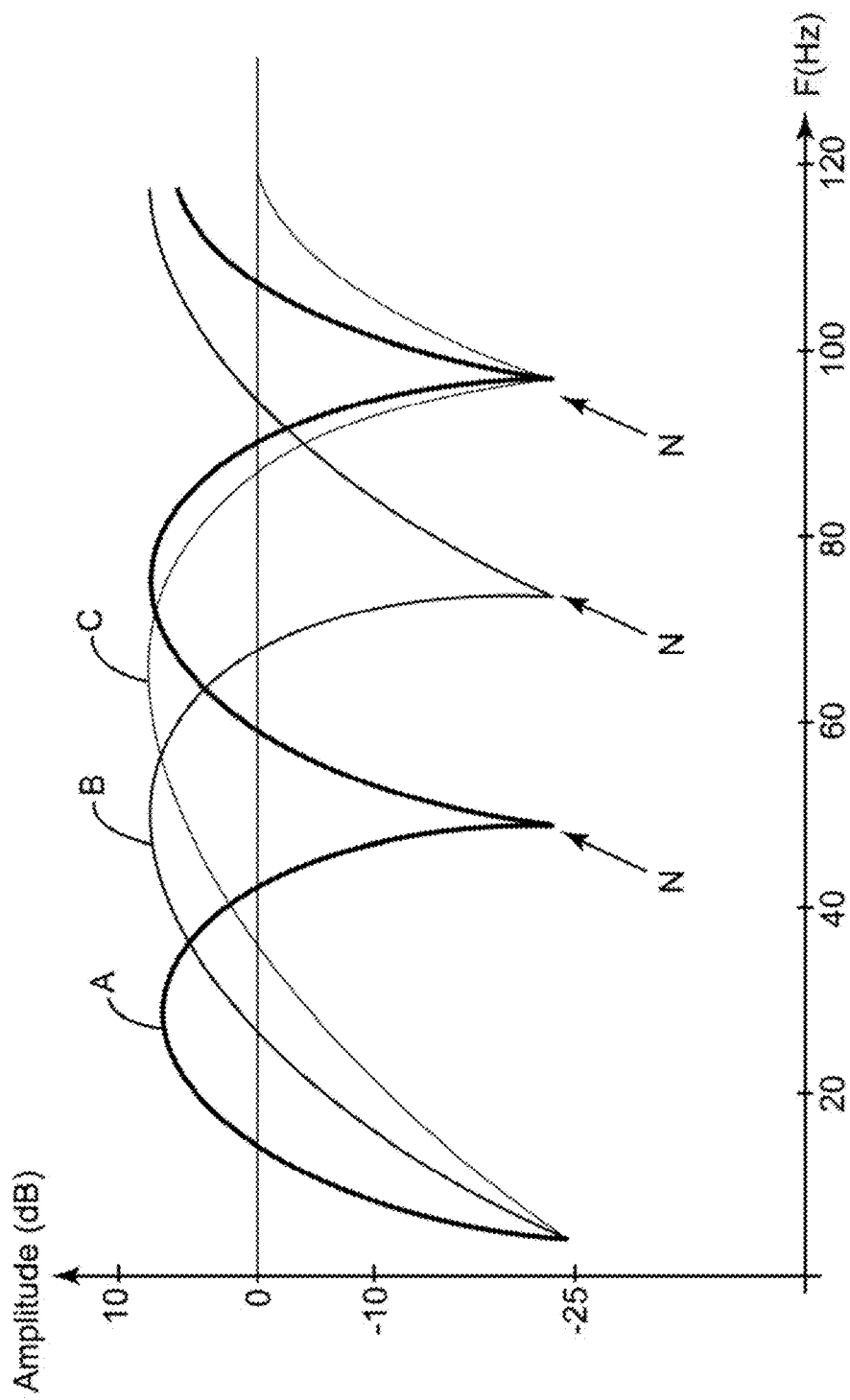
FIG. 3 is a graph showing a frequency spectrum including notches recorded by a traditional streamer.

In conventional acquisition, it is necessary to tow the streamer close to the sea surface so that the first ghost notch occurs beyond the frequency range required for imaging. However, this choice also results in attenuation of lower frequencies as shown in FIG. 3. FIG. 3 shows notches N in the amplitude spectrum caused by ghosts at different stream depths (e.g., amplitude spectrum A is obtained for a streamer having a depth of 7.5 m, amplitude spectrum B is obtained for a streamer having a depth of 15 m, and amplitude spectrum C is obtained for a streamer having a depth of 18 m). Further, towing the streamer close to the sea surface increases the noise recorded at the low-frequency end. Thus, in the past, the ghost notches dictated the depths at which sources and streamers were towed.

As the streamer is moved deeper, a better low-frequency response is obtained, with a lower noise level, but the ghost notches affect the seismic passband. For low frequencies, and especially for deep penetration in challenging geological environments, such as basalt or very deep layers, it is beneficial to tow the streamer deep. However, unless the notches are removed, the higher frequencies will suffer, which is undesirable. In cases where only low frequencies are of interest, for example up to 25 Hz, and it is acceptable to sacrifice the high frequencies (e.g., all the frequencies above 25 Hz), a tow depth of 25 m could be used.

This problem of towing deeper but with fewer frequencies has led to compromises in the bandwidth recorded for most surveys. Different acquisition techniques have been proposed to overcome this problem, including deep-towed dual sensor streamers, with the up-going waves recorded by the geophone being used to fill in the notch in the hydrophone data, or towing pairs of streamers at different depths to yield a fuller frequency range by combination and deghosting.

The broadband marine solution developed by the inventor of this patent application is capable of acquiring both low and high frequencies with the same set of streamers by providing a variable-depth towing configuration (in a plane perpendicular or substantially perpendicular to the water's surface) that delivers an elegant solution with an improved bandwidth and, thus, a sharper image of the subsurface. With this novel configuration, the receiver ghost notch varies along the cable and this "notch diversity" is exploited by deghosting and imaging techniques for generating a high-quality final image. The produced wavelet yields both a high signal-to-noise ratio and maximum bandwidth, which provide the clearest images of the subsurface for a target depth.

According to an exemplary embodiment, the variability of the streamer depth and the shape of the streamer and, hence, the diversity of the streamer ghost notch, may be tuned for different targets so that notch diversity and output spectra are optimized for each survey. The streamer shape is designed according to, for example, the water depth, target depth, subsurface composition, velocity profile of the survey area, etc. Thus, discussed in more detail is an algorithm for determining the profile of the streamer for a given survey area.

According to an exemplary embodiment, there is a plurality of detectors distributed (attached or built into the streamer) along a streamer and configured to have variable depths, e.g., on a curved profile, relative to a horizontal line (e.g., the water's surface). The variable-depth profile is determined, as discussed later, based on an analysis of a residual ghost and/or other factors. In another exemplary embodiment, the streamer's profile is parameterized (characterized based on one or more equations having a set of variables) as will be discussed later in more detail. According to still another exemplary embodiment, based on a given velocity model, the residual ghost is minimized in order to determine the streamer's profile.

Before discussing the methodology for determining the streamer's profile, an example of a streamer having a curved profile is provided. As will be seen from the following exemplary embodiment, the curved profile may be parameterized based on three variables. However, this is not necessary for determining the profile of the streamer. Also, the novel method to be discussed later is applicable not only to a curved profile, but, in general, to a variable-depth profile.

Figure 1:
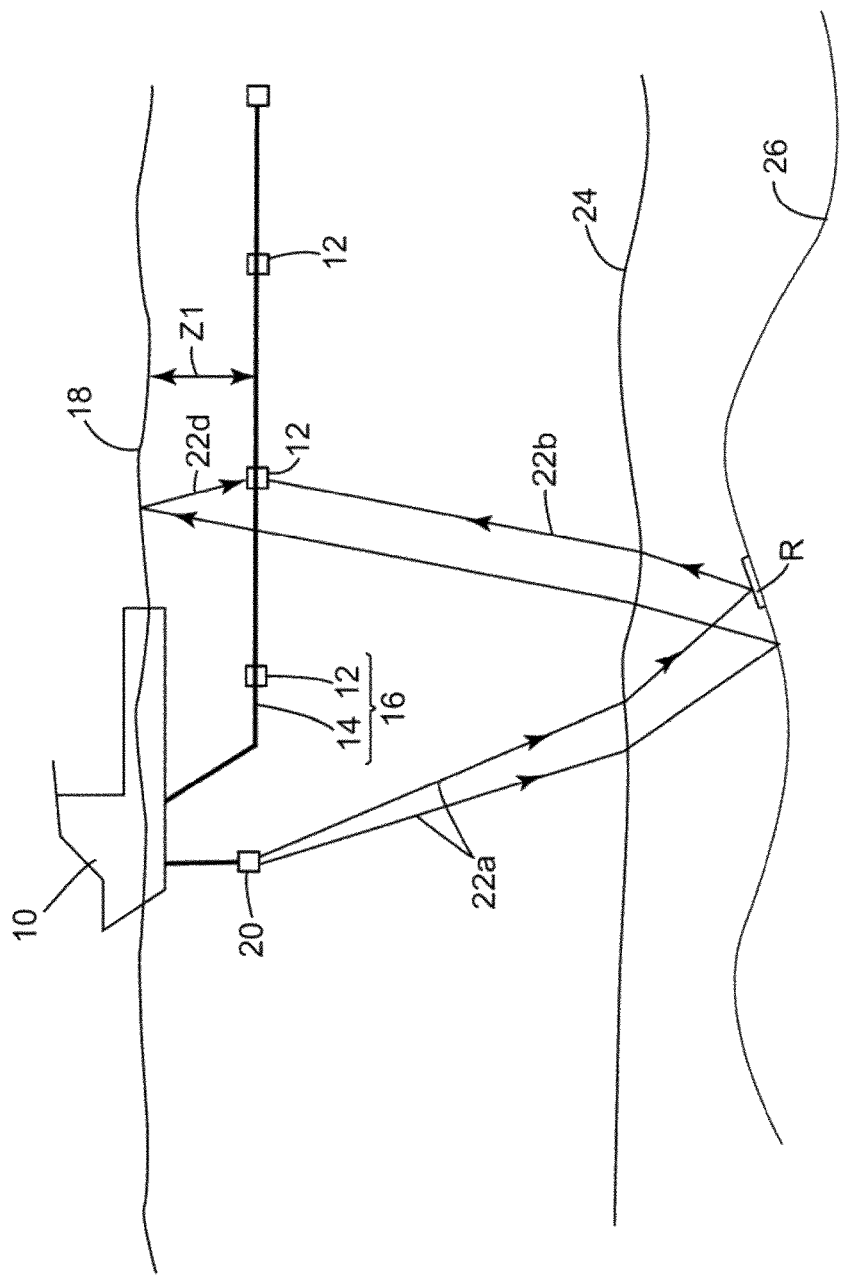
FIG. 1 is a schematic diagram of a conventional seismic data acquisition system having a horizontal streamer.
Figure 2:
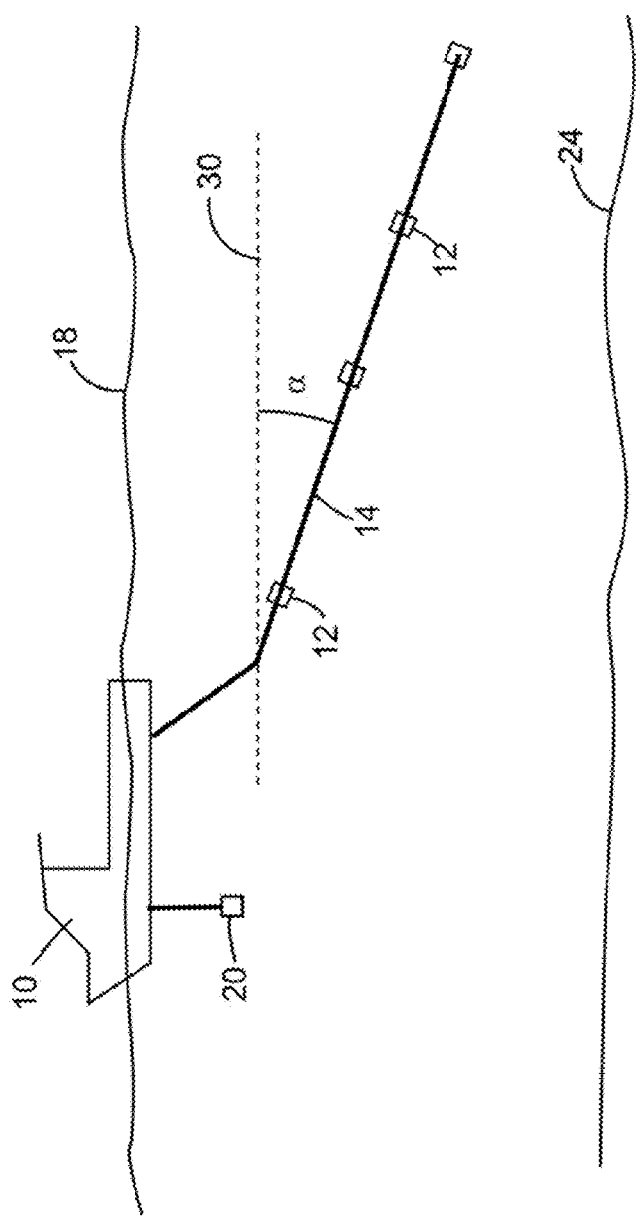
FIG. 2 is a schematic diagram of a conventional seismic data acquisition system having a slanted streamer.
Figure 4:
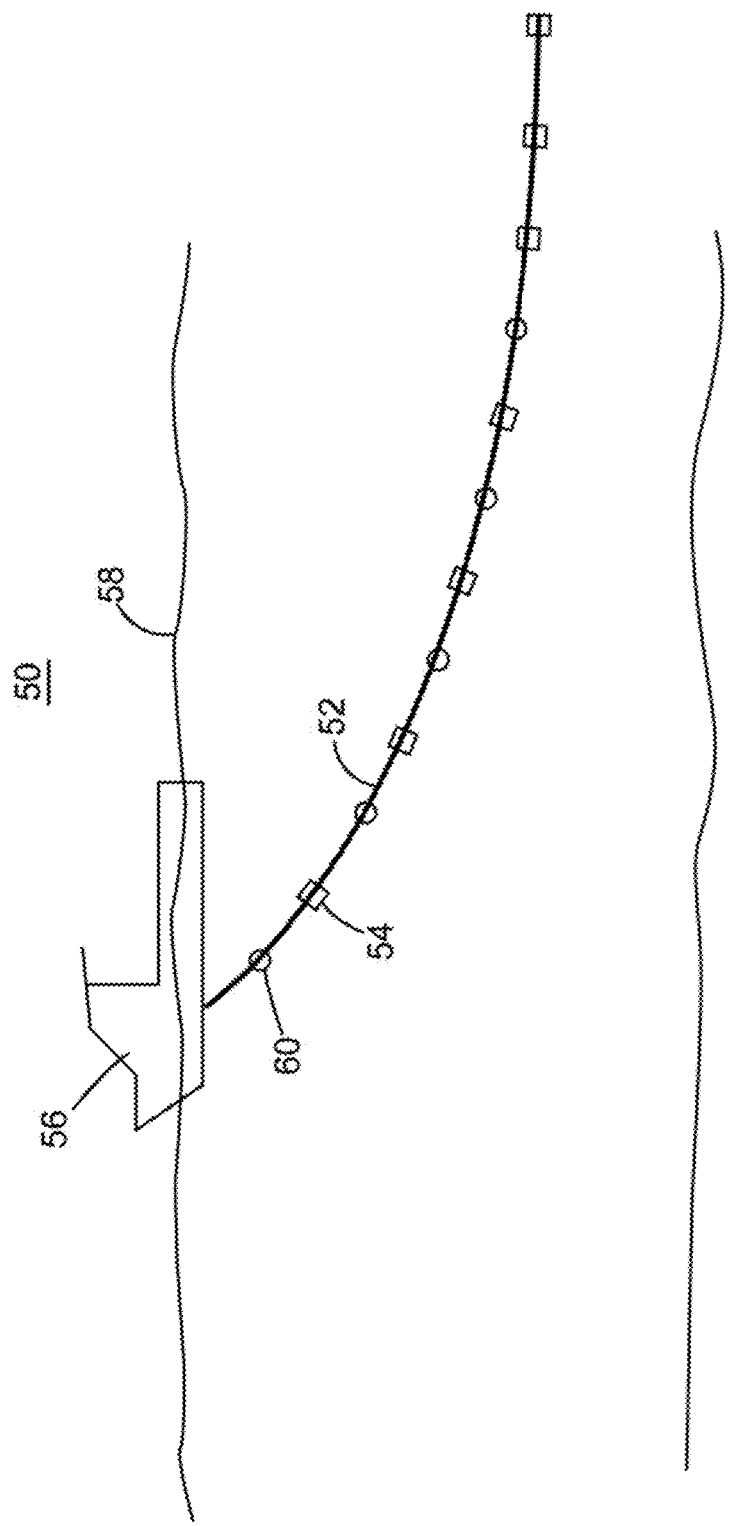
FIG. 4 is a schematic diagram of a streamer having a curved profile.

More specifically, according to an exemplary embodiment, a streamer having some detectors on a curved profile is illustrated in FIG. 4. FIG. 4 shows a system 50 having at least one streamer 52. The streamer 52 includes a body (e.g., cable) with at least one detector 54. For simplicity, both the streamer and the body are identified by the same reference number 52. However, as discussed with regard to FIG. 1, the streamer may include both the body and detectors. In one application, the streamer includes plural detectors 54. The streamer 52 may be connected to a vessel 56 for being towed under the water's surface 58. Towing the streamer 52 underwater is different from laying ocean-bottom cables for at least the following reason.

In one exemplary embodiment, the distance between consecutive detectors 54 is constant. However, in another application, the distance between consecutive detectors 54 varies. For example, the distance between consecutive detectors at the beginning and end of the body may be smaller than the distance between consecutive detectors in the middle of the streamer. A distance between two consecutive detectors may be in the range of meters or tens of meters. A length of the streamer may be in kilometers, e.g., 10 km.

To achieve the curved profile shown in FIG. 4, plural birds 60 (or equivalents, such as deflectors, etc.) may be provided along the streamer. A bird may be simply a weight that sinks a corresponding part of the streamer to a desired depth, assuming the body floats in normal conditions. Alternatively, the bird may be a more or less sophisticated device configured to maintain a desired depth underwater as well as separation between streamers in applications using multiple streamers. For example, the bird may have wings or other devices for manoeuvring up, down, left, right, etc. The bird, similar to the detectors, may be electrically connected to the vessel for control and/or data collection. In another embodiment, the birds are self-powered with individual batteries.

A detector is a generic name for any device capable of measuring a pressure wave or another quantity (e.g., particle velocity or displacement of the medium) indicating the presence of an acoustic wave. Examples of such detectors are a geophone, a hydrophone or an accelerometer, and they are known in the art, so a detailed description of these devices is not provided herein.

The curved shape of the streamer 52 may have different profiles, as discussed next, which extend in a plane that enters the water, e.g., perpendicular to the water's surface. In one exemplary embodiment illustrated in FIG. 5, the curved profile of the streamer 52 may be defined by three parametric quantities (or variables), $z_0$, $s_0$ and $h_c$. Note that the entire streamer does not have to have the curved profile. In other words, the curved profile should not be construed to always apply to the entire length of the streamer. While this situation is possible, the exemplary embodiments do not prohibit a streamer with only a partially curved profile. Thus, the streamer may have (i) a curved profile for its entire length, or (ii) a portion curved and a portion flat, with the two portions attached to each other and forming the streamer.

Figure 5:
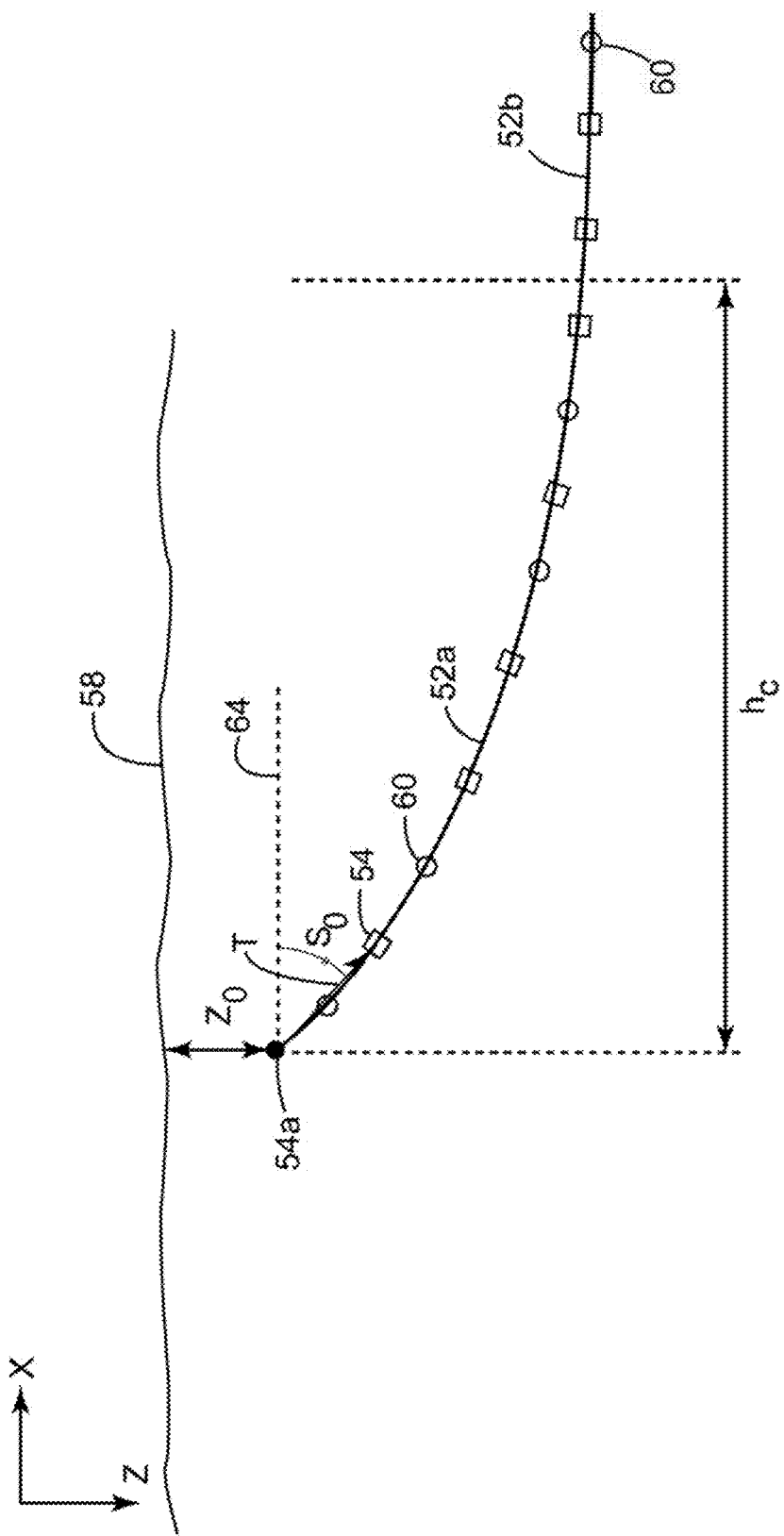
FIG. 5 is a schematic diagram of a seismic data acquisition system having a curved streamer according to an exemplary embodiment.

As illustrated in FIG. 5, the first parameter $z_0$ indicates the depth of a first detector 54a of the streamer relative to the water's surface 58. This parameter may have a value in the range of meters to tens of meters. For example, $z_0$ may be around 6 m. However, as would be recognized by those skilled in the art, the value of $z_0$ depends on each application and may relate to the depth of the bottom of the ocean, the depth of the reflectors, the power of the sound source, the length of the streamer, the velocity model, etc.

The second parameter $s_0$ is related to the slope of the initial part of the streamer 52 relative to a horizontal line 64. The slope $s_0$ is illustrated in FIG. 5 and is determined by (i) a tangent T to an initial part of the streamer and (ii) the horizontal line 64. Note that the slope of the curved profile at point 54a is given by a ratio of the change of the curved profile along the Z axis with respect to the change along the X axis. The slope is thus equal to the mathematical value of the tangent of the angle corresponding to the slope $s_o$, i.e., slope (at point 54a in FIG. 5)=tan(angle). Further, note that for small angles (e.g., five or less degrees), tan(angle) is approximately equal to $s_o$, if the angle is expressed in radians and not in degrees. Thus, for small angles, the slope and the angle may be used interchangeably. In one embodiment, the value of the slope $s_0$ may be between 0 and 6 percent. In another embodiment, the slope has a non-zero value. The example shown in FIG. 5 has an initial slope $s_0$ equal to substantially 3 percent. Note that the profile of the streamer 52 in FIG. 5 is not drawn to scale, because a slope of 3 percent is a relatively small quantity (i.e., a change in depth of 3 m when advancing 100 m along the X axis).

Figure 6:
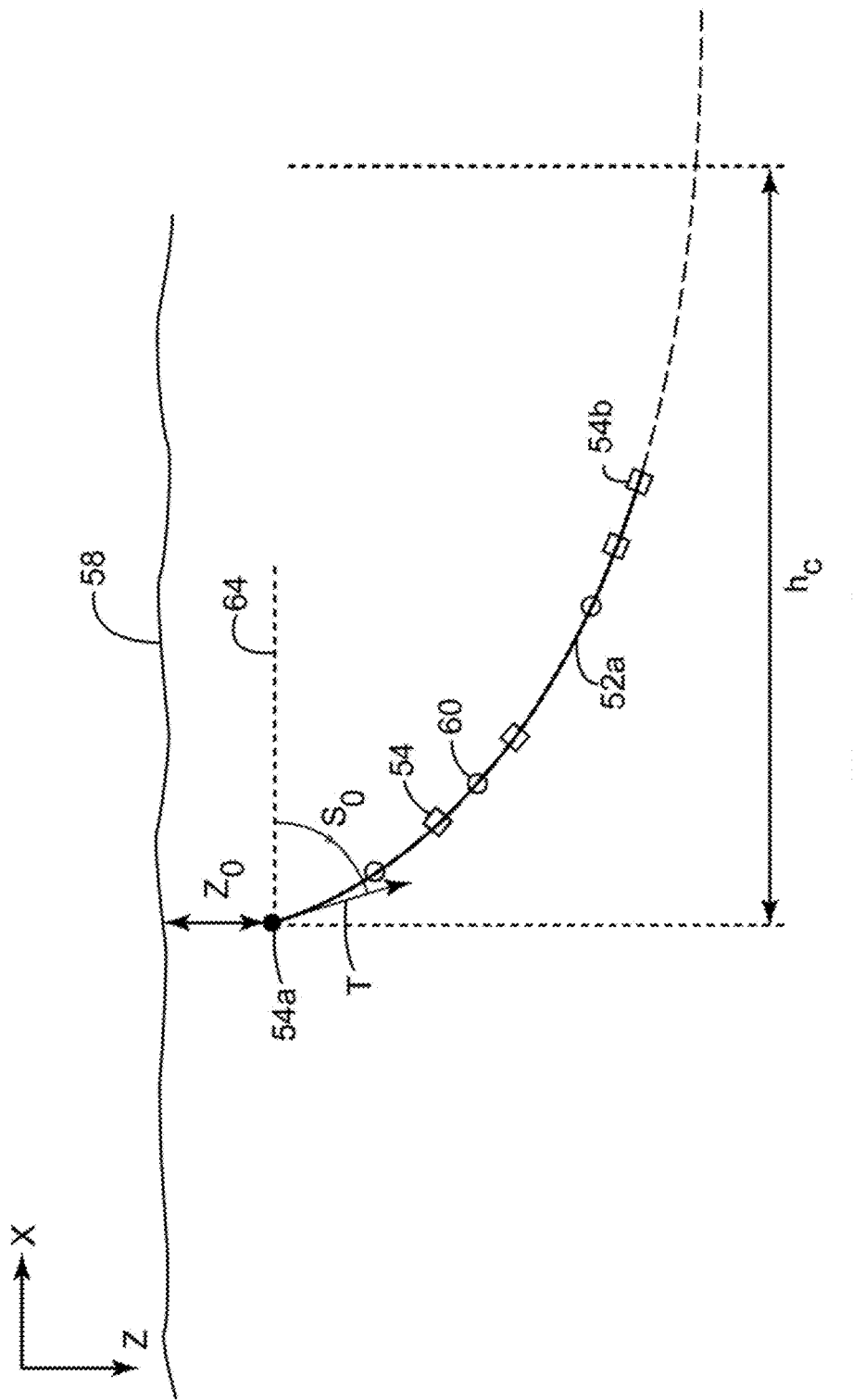
FIG. 6 is a schematic diagram of a seismic data acquisition system having a curved streamer according to another exemplary embodiment.

The third parameter $h_c$ indicates a horizontal length (distance along the X axis in FIG. 5) measured from the first detector 54a of the streamer's curved portion to the end of the curved portion. This parameter may range hundreds to thousands of meters. For example, $h_c$ is around 3000 m for the configuration shown in FIG. 5, defining the end of the curved part of the streamer 52. In other words, the streamer 52 may have a curved first portion 52a and a second portion 52b that is flat, differently curved or slanted. Parameter $h_c$ defines the first portion 52a. Note that in one application the streamer 52 has both the first portion 52a and second portion 52b, while in another application the streamer 52 has only the first portion 52a. Such an embodiment is illustrated in FIG. 6 in which the detectors 54 lie only on the first portion 52a, with detector 54b being the last one on the streamer 52. Note that a projection along line 64 of the length of the streamer 52 in FIG. 6 may be less than $h_c$. In other words, in some embodiments, the streamer does not extend along the entire curved profile, i.e., the length of the streamer projected on X axis is less than $h_c$. Also, as already noted above, the curved profile does not have to be curved, it needs only a variable-depth profile.

According to another exemplary embodiment, the curved profile of the streamer 52 may be described, approximately, by the following equations:

$$z(h) = z_0 + s_0 h\left(1 - 0.5\left(\frac{h}{h_c}\right)\right) \text{ for } h \leq h_c, \quad (1)$$

and $$z(h)=z_0+s_0 \cdot 0.5 \cdot h_c \text{ for } h > h_c \text{ with } s_0 \text{ being a non-zero slope.} \quad (2)$$

In these equations, z is measured along the Z axis and h is measured along the X axis, where Z is perpendicular to the surface of the water and X extends along the water's surface. Also, note that in some applications, only equation (1) may be used to define the streamer's profile, depending on its length. In other words, in some embodiments, the streamer does not have to have a flat portion or other portions at the end of the curved portion. For seismic data acquired with streamers disposed along a profile given by these specific equations, it was found that the clarity of the processed images of the subsurface improved substantially, as discussed for example, in U.S. Provisional Application 61/392,982. Further, note that the first equation (1) provides the curved profile, while the second equation (2) provides a straight line (constant depth).

Those skilled in the art would understand that the values provided by equations (1) and (2) are approximate because the detectors are under constant motion exerted by various water currents and the vessel's movement. In other words, it is understood that detectors distributed substantially on the curved profile described by equation (1) and/or (2), e.g., at positions as close as 10 to 20 percent of the real curve in terms of the actual depth z(h), are envisioned to be covered by the equations above.

In another exemplary embodiment, z(h) may generally be described by a parabola, hyperbola, circle, or any other curved or variable-depth line. In one exemplary embodiment, the profile may be formed by two or more different curved profiles, e.g., a parabola with a circle, etc.

In another exemplary embodiment, the birds 60 attached to the streamer 52 are placed at specific locations so the streamer assumes the desired curved profile, e.g., parabola, hyperbola, circle, etc. For example, if the curved stream's profile is a circle, the radius of curvature may be around 50 km. Thus, according to this exemplary embodiment, the detectors may not be exactly located on the desired curved profile but substantially thereon, e.g., in the range of 10 to 20 percent of the actual depth z(h).

According to an exemplary embodiment, the depth of the birds and/or the detectors may be between 5 and 50 m. However, those skilled in the art would understand that, as detector technology improves, these ranges may increase to over 250 m. Thus, the numbers presented herein are for exemplary purposes and not intended to limit the applicability of the exemplary embodiments.

Having discussed the variable-depth profile of the streamer, now a process for determining this profile is discussed. Note that the streamer's profile may vary from survey to survey, depending on the regional velocity profile of a subsurface to be imaged, the depth of the reflectors of the subsurface, the depth of the ocean bottom, etc. Further note that by having the detectors at different depths (i.e., on the variable-depth profile), notches experienced by one detector may be removed when using data from detectors at different depths. Thus, the frequency spectrum to be used for generating the final image is broadened beyond the capabilities of traditional methods and devices.

According to an exemplary embodiment, the streamer's curved profile is determined by computing a residual ghost for different reflector depths and selecting the curved profile that produces the best (e.g., minimum) residual ghosts. Other criteria may be used as later discussed. The concept of residual ghost has been described, for example, in U.S. patent Ser. No. 13/155,778, assigned to the Assignee of this patent application, the entire disclosure of which is incorporated herein by reference.

The residual ghost concept is discussed briefly now. Traditionally, the ghost is removed at an early stage of processing, by deterministic deconvolution on shot gathers. U.S. patent Ser. No. 13/155,778 (herein '778) describes how, if the ghost is not removed at the preprocessing stage, after the migration process is carried out, an image d(x, y, z) of the subsurface is obtained (x, y, and z are the coordinates of a point in the subsurface), and this image includes a residual ghost. The image d(x, y, z) may be considered equal to a reflectivity r(x, y, z) (corresponding to the reflectors in the subsurface) convoluted in z with a residual ghost transfer function g(z) as expressed by the following equation:

$$d(x,y,z)=g(z)*r(x,y,z).$$

The residual ghost transfer function g(z) is causal and, as it depends only weakly on a position (x, y, z), the above relation is valid within a given volume. Application '778 also describes that if a mirror imaging process is carried out on the shot gathers, an image of the subsurface is obtained which is equal to the same reflectivity as before convoluted with an anticausal residual mirror ghost transfer function. This is due to the fact that primary events are perfectly stacked by the migration and ghost events imperfectly stacked, while in the mirror migration, ghost events are perfectly stacked with their polarity reversed and primary events imperfectly stacked. The application '778 also describes a process called joint deconvolution that uses both the migration and the mirror migration. The joint deconvolution is capable to estimate the residual ghost and residual mirror ghost and provides a deghosted migration.

Other methods for determining the residual ghost g(z) can be used. One possibility is to use a minimum-phase deconvolution with white reflectivity on the image d(x,y,z). Another possibility is to use a deterministic transfer function computation between the migration $d_0$(x,y,z) of the shot gathers modeled without a reflecting water surface and the migration d(x,y,z) of the shot gathers modeled with a reflecting water surface. Because minimum-phase deconvolution with white reflectivity and deterministic transfer function computation are processes known in the art, their description is omitted here.

Figure 7:
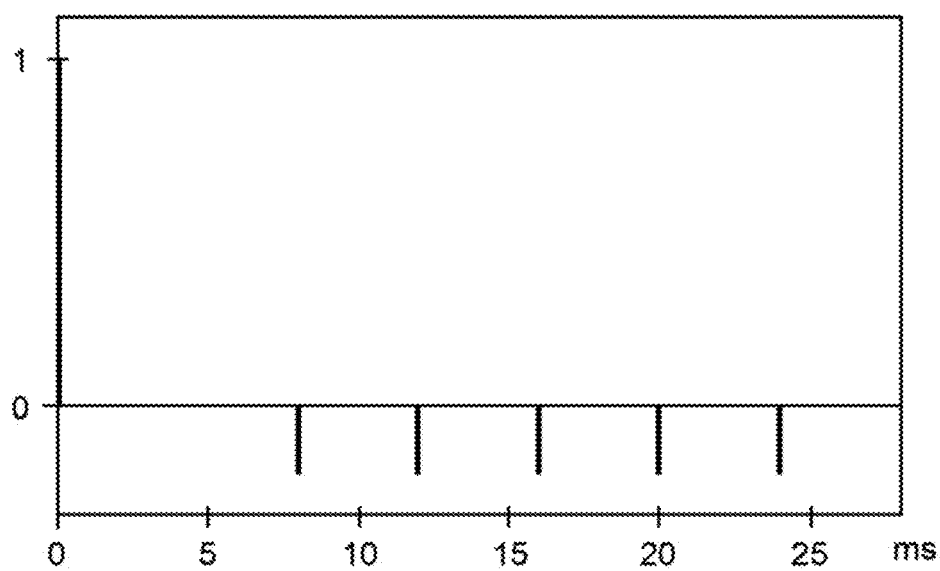
FIG. 7 is a graph of residual ghost according to an exemplary embodiment.
Figure 8:
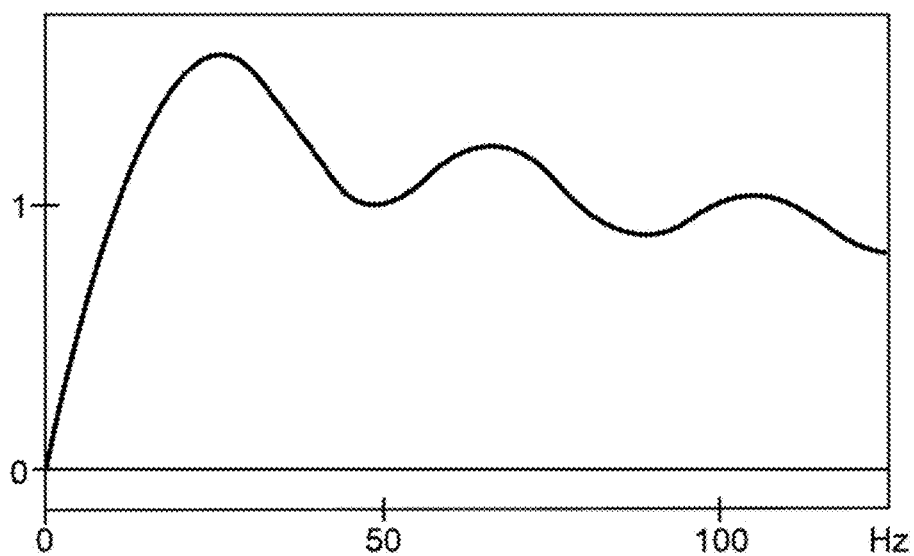
FIG. 8 is a graph of a residual ghost spectrum according to an exemplary embodiment.

Whatever method is used to estimate the residual ghost g(z), the quality of the final deghosted migration depends on the notches of the residual ghost. Data recorded with a variable-depth streamer (e.g., curved profile) has the advantage that the residual ghost has no perfect notches apart from the zero Hz notch. Thus, the residual ghost needs to be deconvolved above a minimum frequency fmin. An example of a residual ghost is shown in FIG. 7, and a residual ghost spectrum is shown in FIG. 8. The residual ghost spectrum shown in FIG. 8 is obtained by applying, for example, a Fourier transform to the residual ghost of FIG. 7.

With this review of the residual ghost concept, the process for determining the curved profile of the streamer based on the residual ghost is now discussed with reference to FIG. 9. In step 900, a velocity model corresponding to the subsurface of interest is provided. Such a velocity model is exemplified in FIG. 10, which provides an estimated sound velocity for a seismic wave that propagates in the various layers of the subsurface and also the water above the subsurface. The velocity model may be derived from real data, i.e., from a previous survey, or may be predicted based on various factors known by those skilled in the art.

In step 902, a couple of reflectors are selected and shot data is generated. The reflectors are exemplified in FIG. 11, which depicts five reflectors 100 to 108 at various depths (on Y axis) in the subsurface of interest. The X axis indicates the reflectors' length. The reflectors, as known in the art, are usually interfaces between different layers of the subsurface, the different layers having different impedances. Thus, an acoustic wave traveling down into the earth may suffer a reflection at any of the reflectors. The first three reflectors in this embodiment are selected based on a region of interest in the survey area, e.g., reflector 100 at the ocean bottom, and reflectors 102 and 104 around a potential reservoir. Reflector 108 is at the deepest level beyond which there is no interest in surveying the subsurface, and reflector 106 is between the area of interest (determined by reflectors 100, 102 and 104) and the deepest level 108. The number of reflectors that may be selected is not restrictive.

Figure 11:
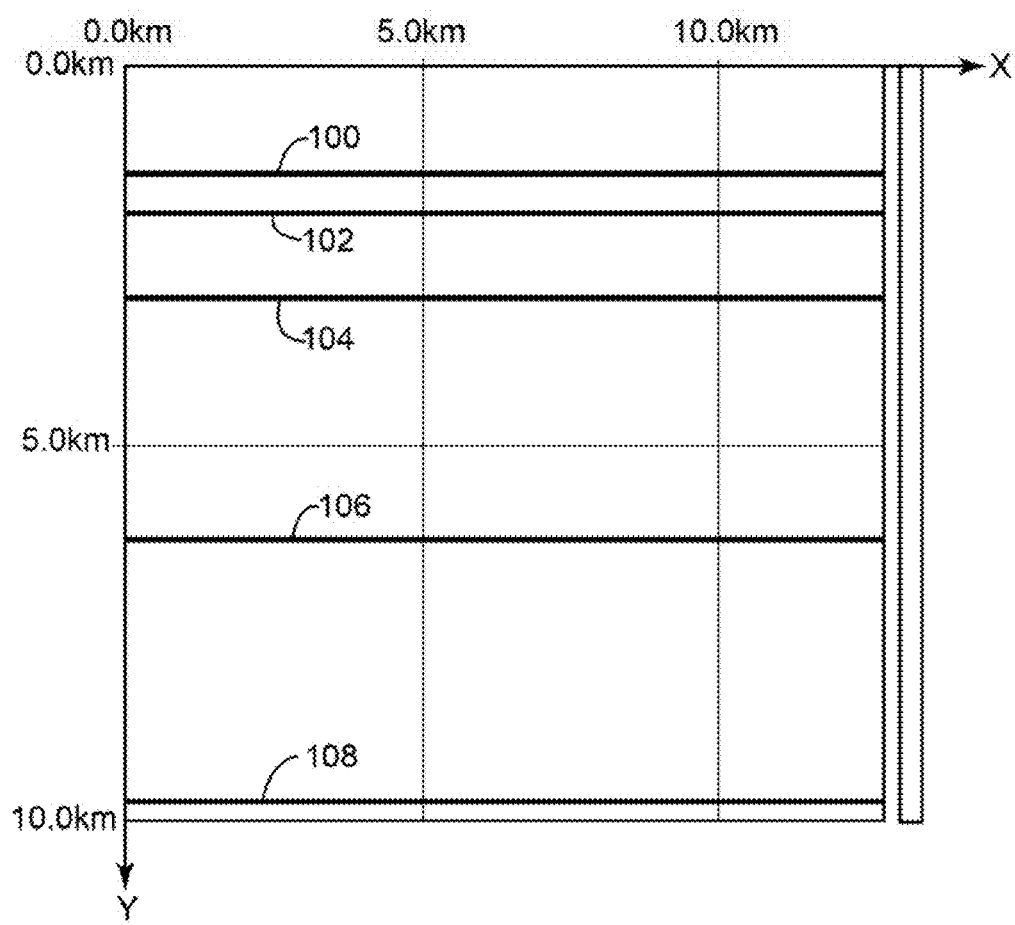
FIG. 11 illustrates plural reflectors selected at various depths according to an exemplary embodiment.

Further, note that the reflectors exemplified in FIG. 11 may not correspond to real interfaces. In other words, the reflectors may be selected by the operator of the survey based on experience, practice or other information which does not necessarily match the real reflectors. Alternatively, the reflectors are determined from previous survey data of the desired subsurface and correspond to real interfaces between layers in the subsurface.

Figure 12:
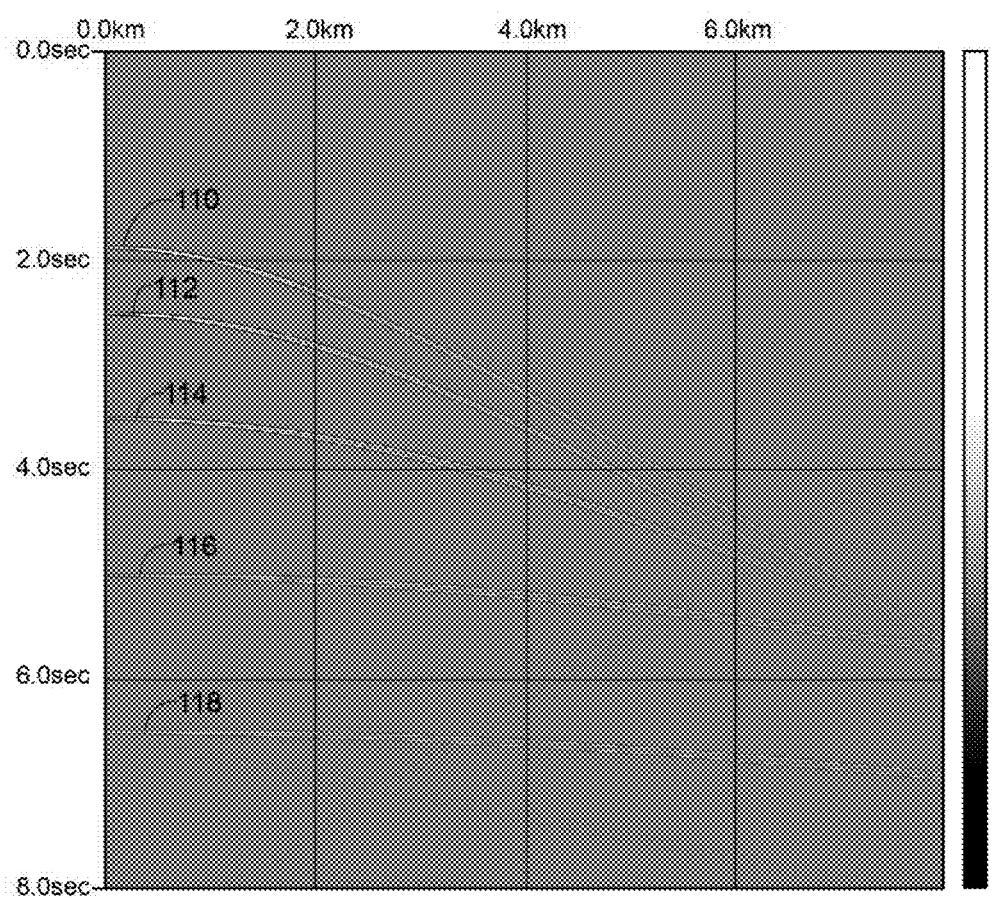
FIG. 12 illustrates shot data according to an exemplary embodiment.

The shot data, which is illustrated in FIG. 12, is calculated based on the velocity model, a profile of the streamer chosen in step 904, and the reflectors 100 to 108. Note that the Y axis is a time axis that indicates the time delay between firing a seismic source and recording a reflected wave (reflected by the selected reflectors and recorded by the streamer with the selected profile). FIG. 12 illustrates the time delays 110 to 118 corresponding to the reflectors 100 to 108, respectively. In other words, the shot data in FIG. 12 is modeled data in the sense that, based on the reflectors of FIG. 11, one would expect to record the traces shown in FIG. 12 when probing those reflectors with seismic waves emitted by real seismic sources. In addition, when determining (calculating) the shot data, a curved profile of the streamer is already assumed and included in the calculation. Thus, the results to be shown later correspond to the chosen curved profile. If the results are not appropriate (various criteria will be discussed later), it is concluded that the curved profile selected in step 904 is inappropriate and another curved profile is selected in step 904. The remainder of the algorithm repeats until the results confirm the selected profile.

Figure 9:
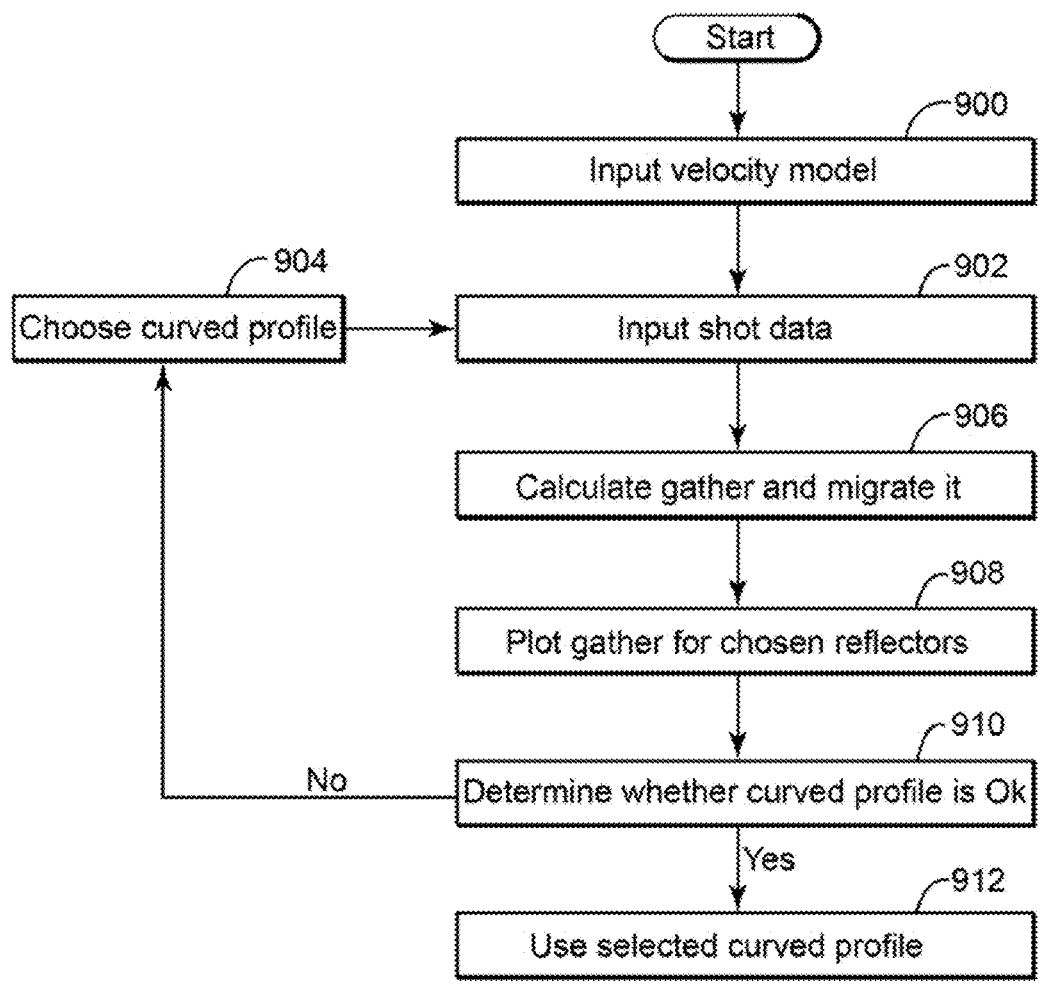
FIG. 9 is a flowchart of a method for determining a shape of a streamer according to an exemplary embodiment.
Figure 10:
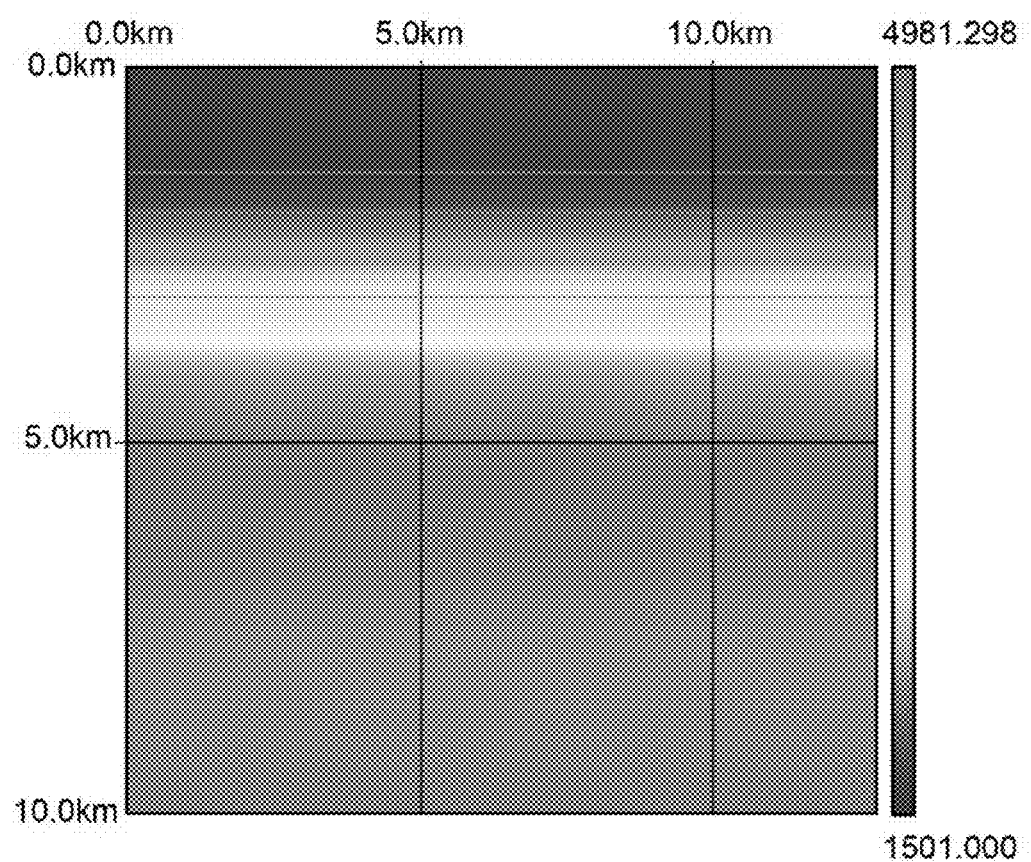
FIG. 10 is a graph of a velocity model according to an exemplary embodiment.
Figure 13:
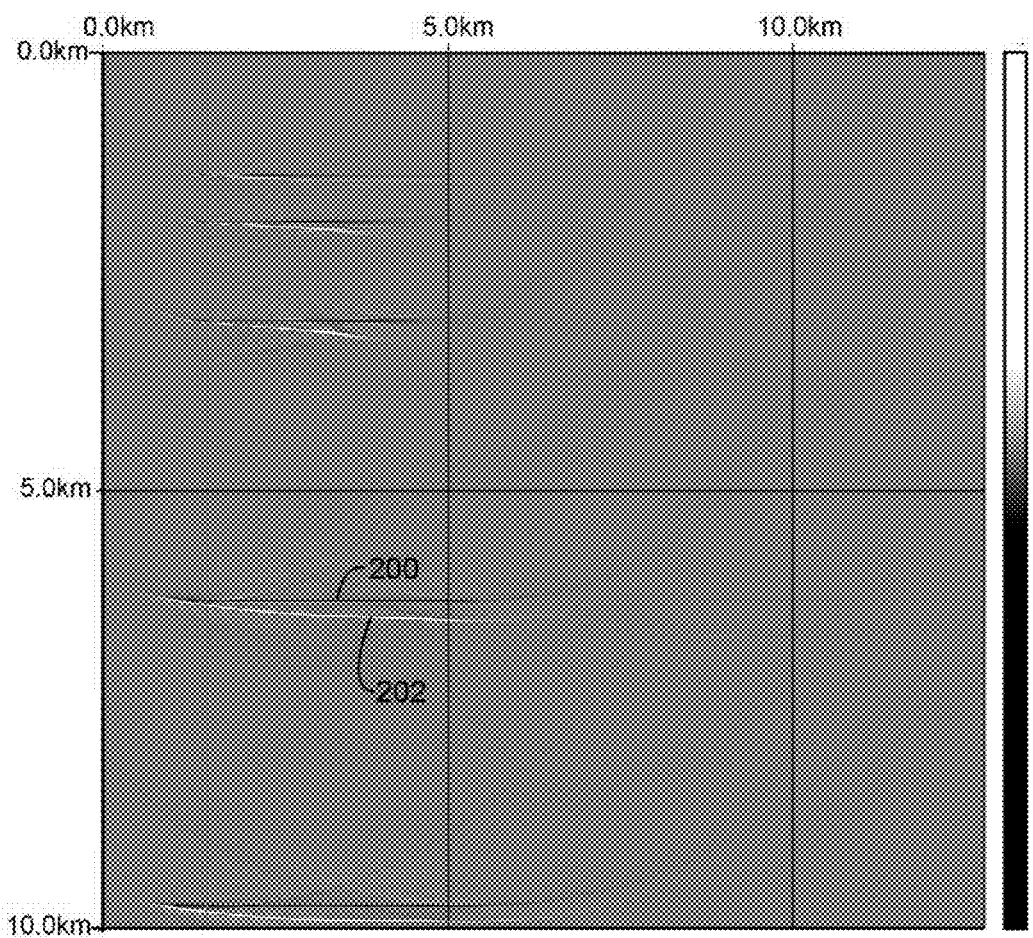
FIG. 13 illustrates migrated gathers according to an exemplary embodiment.
Figure 14:
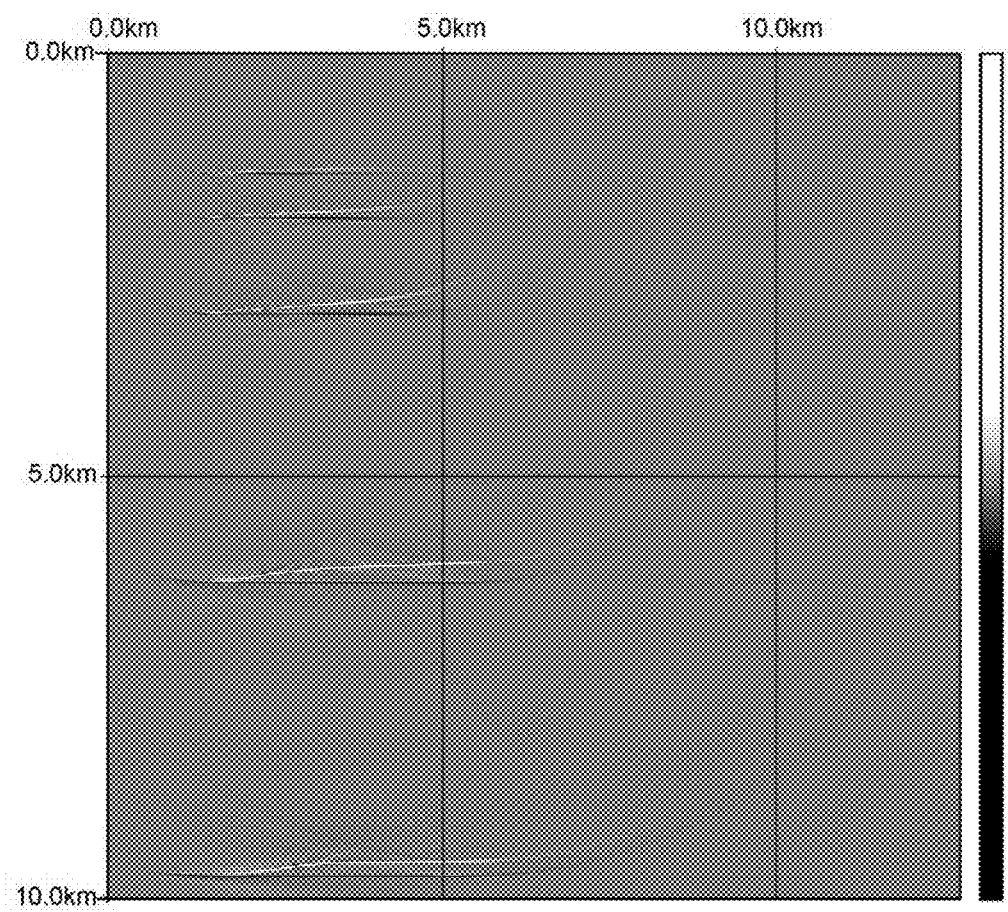
FIG. 14 illustrates mirror migrated gathers according to an exemplary embodiment.

Based on the above shot data, one or more gathers are calculated as illustrated in step 906 in FIG. 9. A gather may be, for example, a collection of recorded traces received from various detectors and summed together (stacked). The traces were selected to correspond to, for example, the same subsurface point. Thus, note that FIG. 9 illustrates a post-stack method for determining the profile of a streamer. However, the same is possible for pre-stack, i.e., using traces instead of the gather for calculating the residual ghost. The gathers are then migrated, for example, as shown in FIG. 13, or mirror-migrated as shown in FIG. 14. Both the migrated gather in FIG. 13 and the mirror-migrated gather in FIG. 14 are migrated in depth. However, this novel algorithm may be applied equally in time. Still with regard to FIGS. 13 and 14, note that the primaries 200 in FIG. 13 are aligned while the ghosts 202 are not. The contrary is true for the mirror-migration in FIG. 14.

Figure 15:
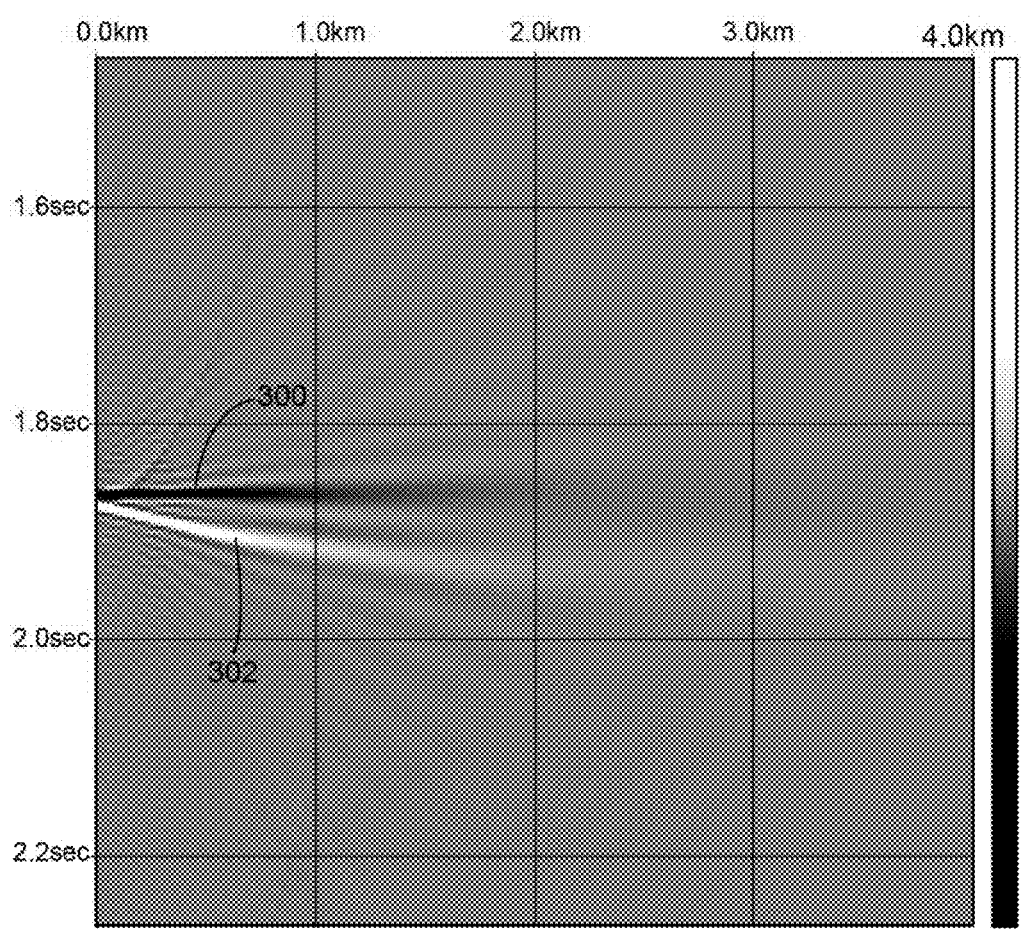
FIG. 15 illustrates a migrated first reflector according to an exemplary embodiment.
Figure 16:
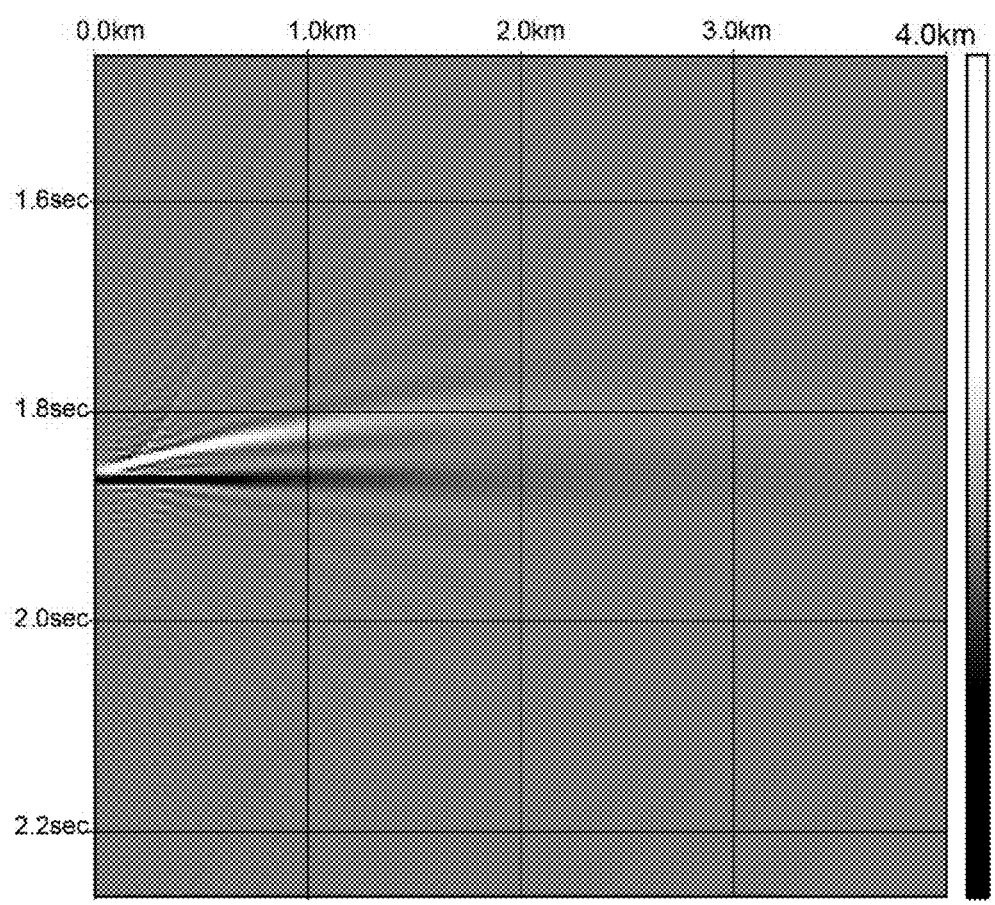
FIG. 16 illustrates a mirror migrated first reflector according to an exemplary embodiment.

The various gathers are plotted, in step 908, for example, in time, either using the migration or the mirror-migration methods. In this step, the ghost, residual ghost and residual ghost spectra (to be described later) may also be calculated and graphically represented. An example of the gather corresponding to the reflector 100, when migrated, is shown in FIG. 15 and when mirror-migrated is shown in FIG. 16. FIG. 15 shows a straight primary 300 and a slanted ghost 302, which indicates a good diversity. However, the primary and ghost are limited to around 1 km (on X axis) which means that only the first part of the streamer was used. Similar results are obtained for the second and third reflectors (i.e., 102 and 104) and for this reason, the primary and ghost for these reflectors are not shown in the figures.

Figure 17:
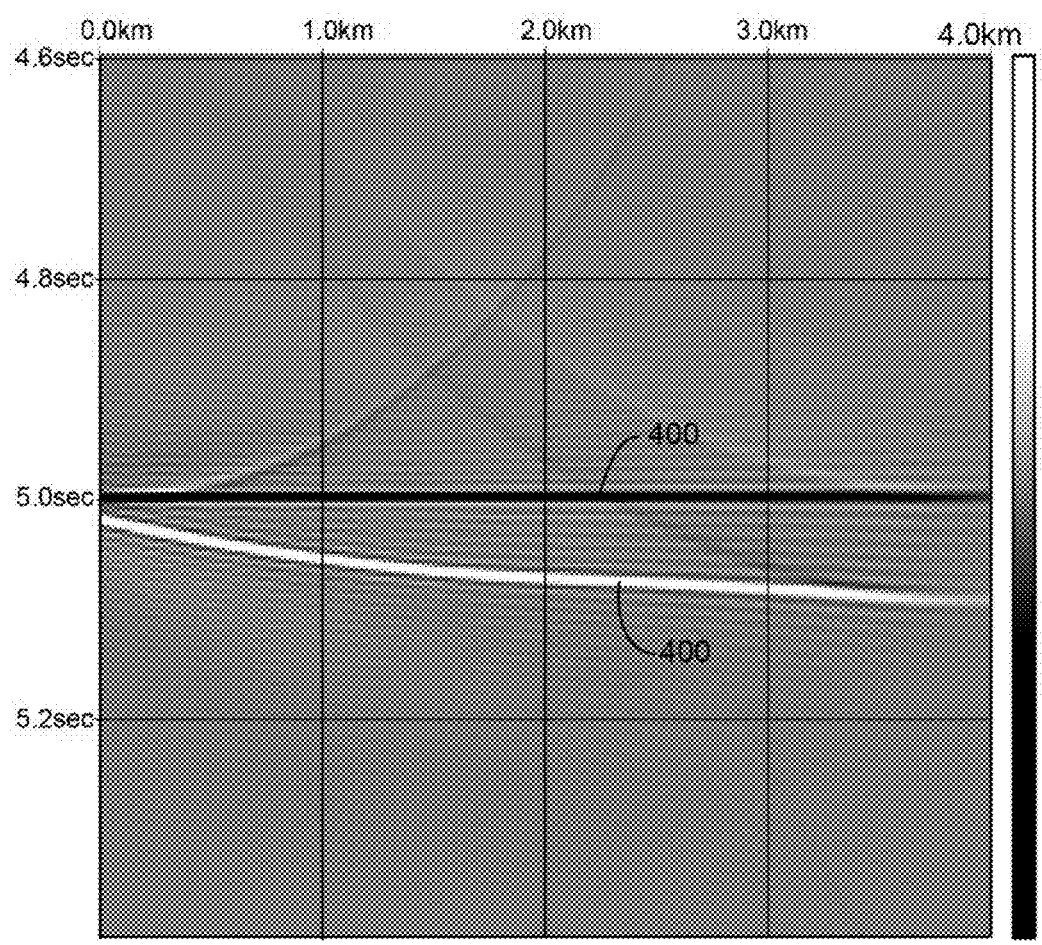
FIG. 17 illustrates a migrated fourth reflector according to an exemplary embodiment.
Figure 18:
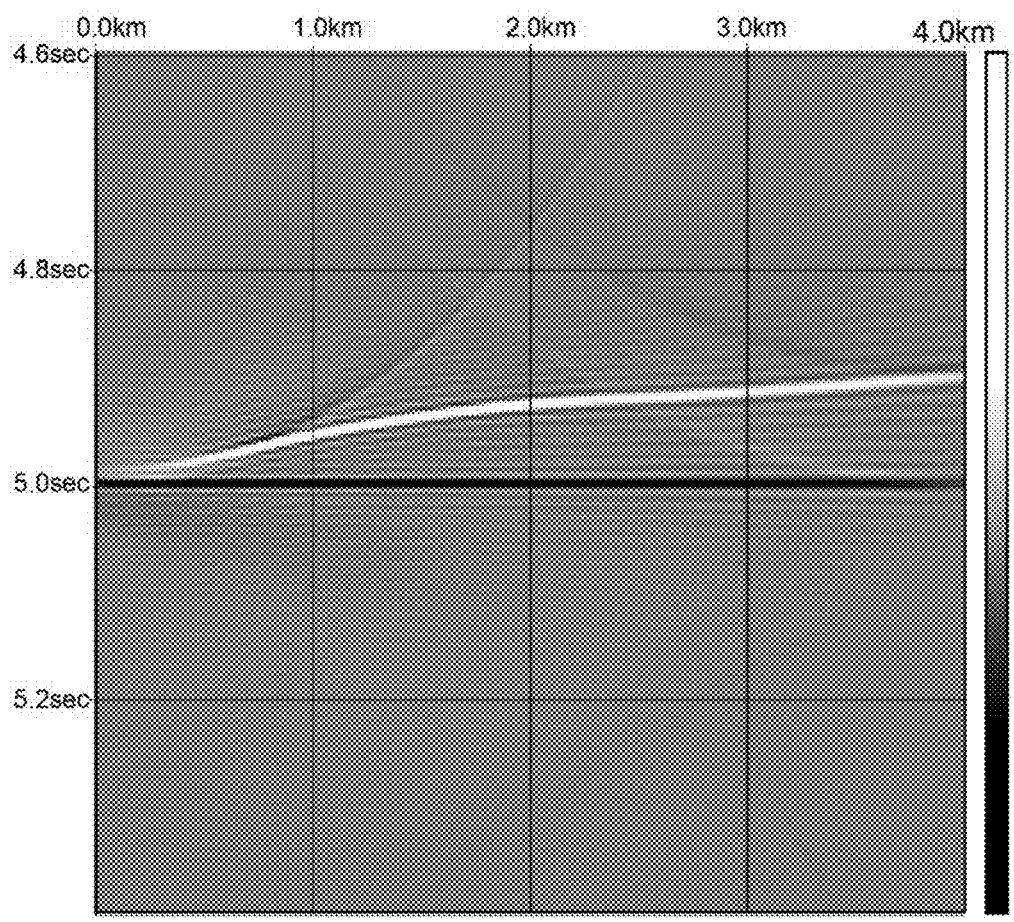
FIG. 18 illustrates a mirror migrated fourth reflector according to an exemplary embodiment.

However, a different trend appears for the last two reflectors 106 and 108. FIGS. 17 and 18 show migrated and mirror-migrated gathers, respectively, for the fourth reflector 106. Note that the ghost 402 diverges less from the primary 400, which is not desirable and indicates that the streamer's curved profile selected in step 904 might not be appropriate. The same situation occurs in FIGS. 19 and 20 for the last reflector 108.

Figure 19:
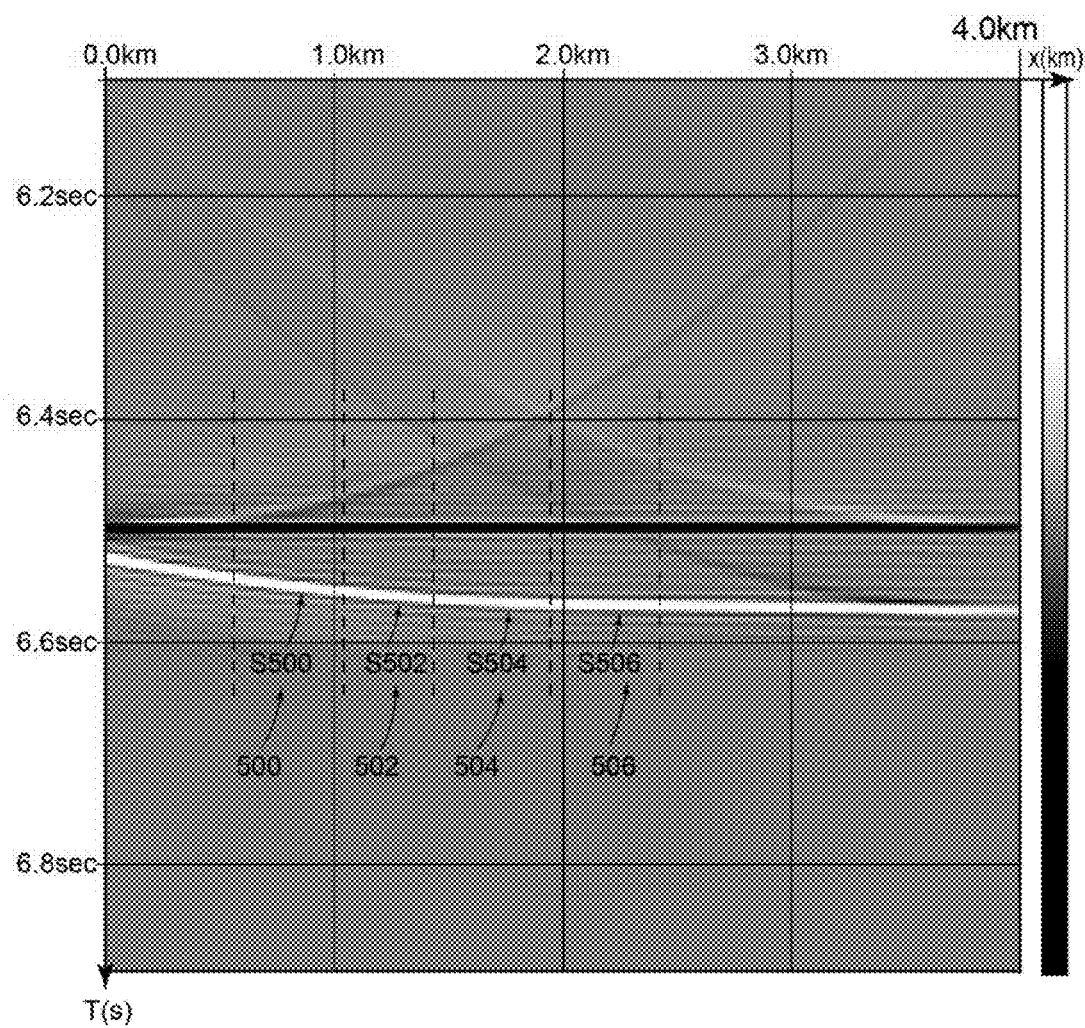
FIG. 19 illustrates a migrated fifth reflector according to an exemplary embodiment.
Figure 20:
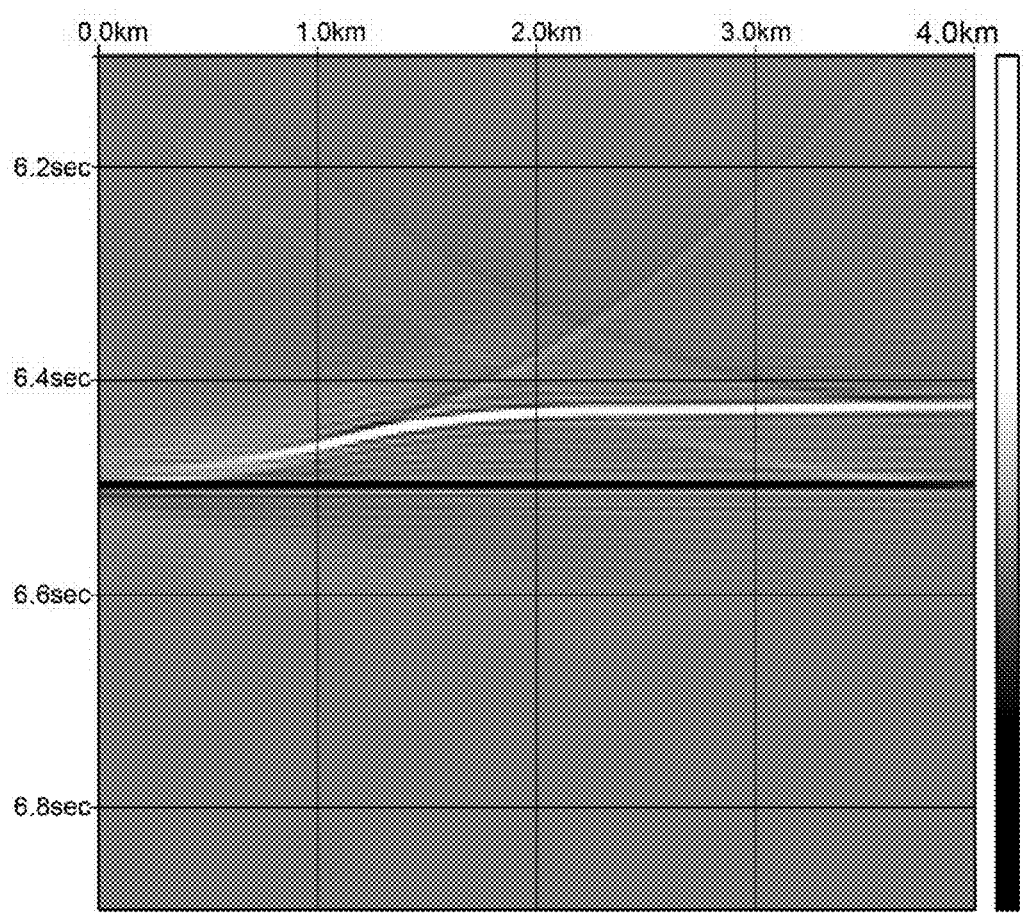
FIG. 20 illustrates a mirror migrated fifth reflector according to an exemplary embodiment.

Thus, the first criterion for determining the validity of the selected profile of the streamer may be the shape of the ghost shown in FIGS. 15-20. For example, with regard to FIG. 19, the gather may be divided into plural portions 500 to 506, each portion corresponding to a predetermined distance range on the X axis, e.g., 0.5 km. If the ghost's slope for each range (e.g., s500, s502, s504, and s506) is not larger than a given threshold, it may be concluded in step 910 that the selected profile for the streamer is inappropriate. For example, as shown in FIG. 19, the slope s506 is substantially zero, which is undesirable. The first criterion may consider one or more of the slopes s500 to s506. Also, the first criterion may consider the streamer's selected profile to be acceptable if some of the slopes s500 to s506 are larger than the given threshold. If the method determines that the selected profile is unacceptable, the algorithm returns to step 904 for selecting another profile. Selection of the new profile may be performed automatically by the processing system, for example, by selecting from a predetermined library of various profiles, or may be performed manually by the system operator. However, in one application, even if the ghost slope's values are not larger than the given threshold for those reflectors which are not in the area of interest, the operator may decide to maintain the streamer's chosen profile if the ghost slope's values are larger than the given threshold for the reflectors of interest. In other words, the above-noted condition may be violated for reflectors other than the reflectors of interest.

Figure 21:
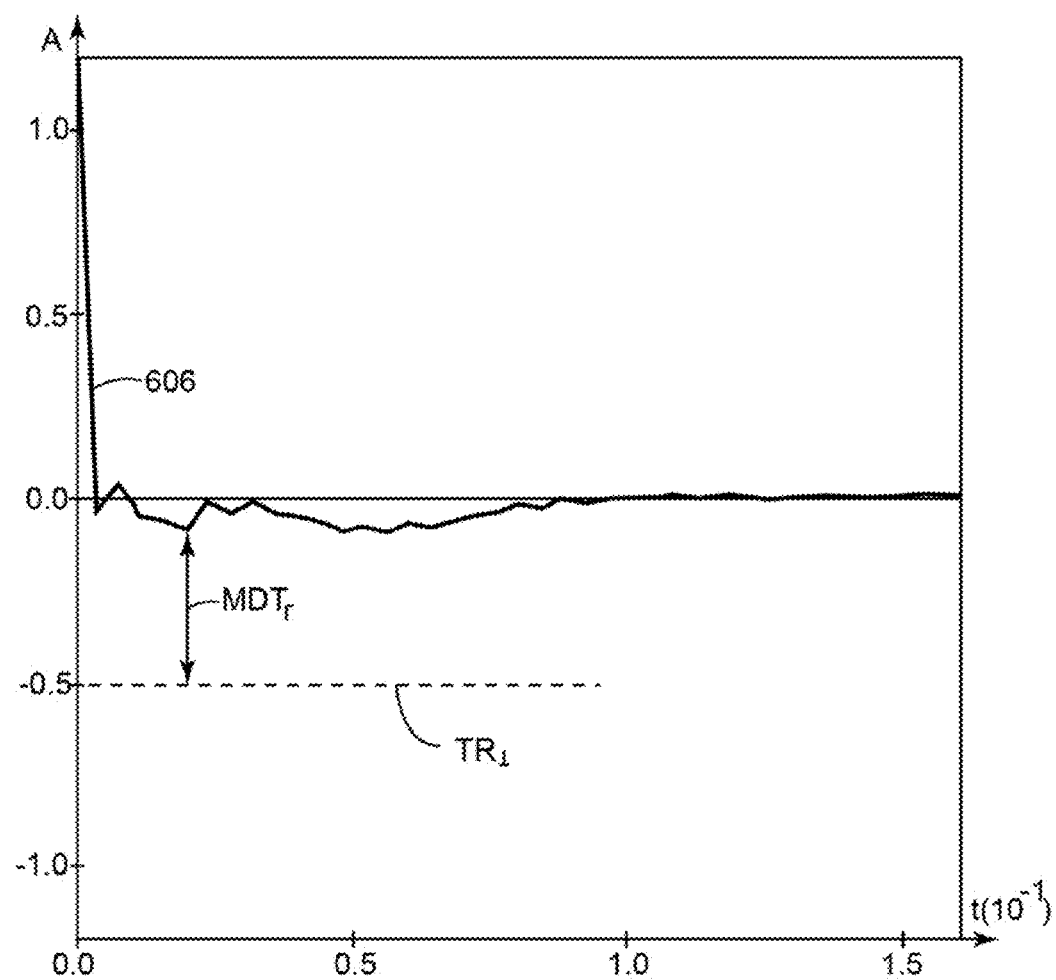
FIG. 21 illustrates a migrated residual ghost for a first reflector according to an exemplary embodiment.
Figure 22:
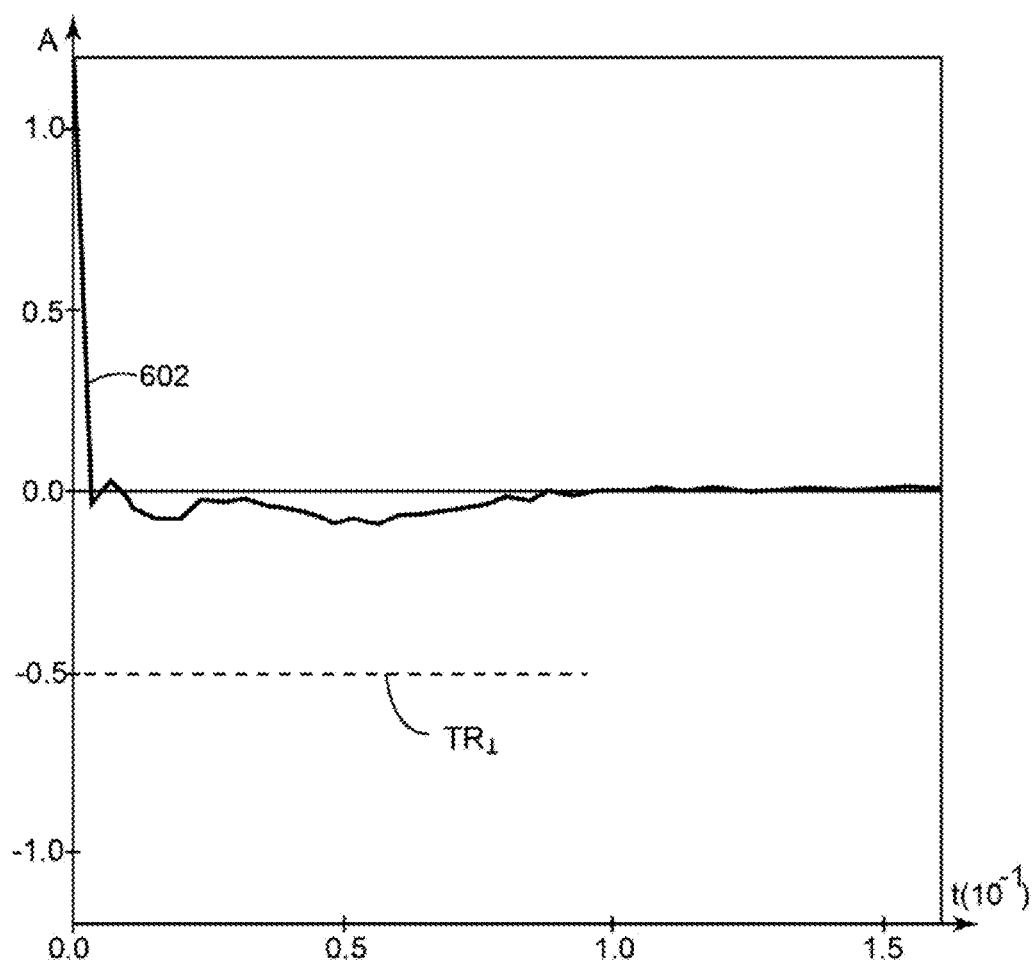
FIG. 22 illustrates a mirror migrated residual ghost for a first reflector according to an exemplary embodiment.

A second criterion is discussed next. FIGS. 15-20 illustrate the primary and ghost for various gathers. For those gathers, a residual ghost may be calculated. FIG. 21 illustrates the residual ghost 606 (the graph plots a relative amplitude versus time of the residual ghost) for the first reflector 100 using the migration method, while FIG. 22 shows the residual ghost 602 for the same reflector using the mirror-migration method. Both figures show that the residual ghost for the first reflector 100 has an amplitude that decreases in time, and the values of the residual ghost are far from a threshold TR1 (e.g., at −0.5), which are indicative of a well-chosen streamer profile. In this regard, a Minimum Distance to Threshold for (r) esidual ghost (MDTr) quantity is introduced to evaluate how close or far the residual ghost is from the threshold TR1. The MDTr is shown in FIG. 21 and defined as the smallest distance between the residual ghost and the threshold TR1 at any given point along the time axis. The MDTr varies from survey to survey.

Figure 23:
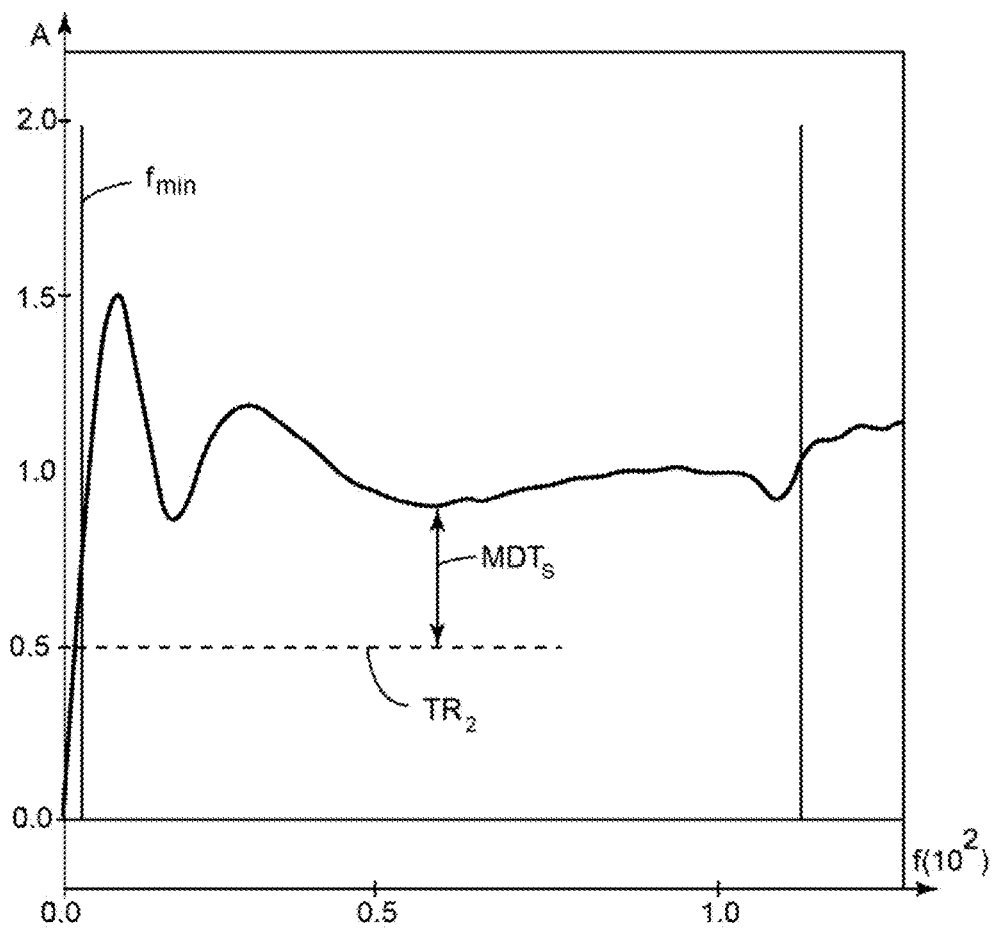
FIG. 23 illustrates a migrated residual ghost spectrum for a first reflector according to an exemplary embodiment.
Figure 24:
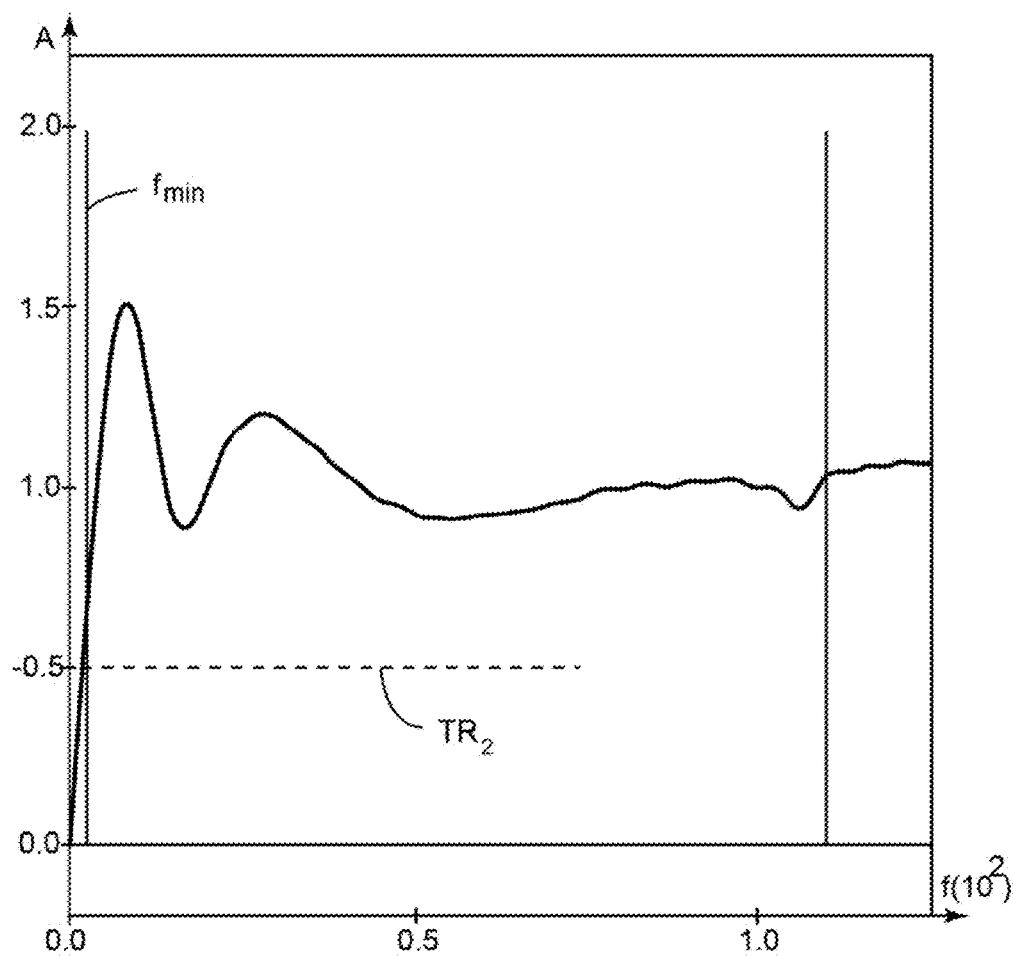
FIG. 24 illustrates a mirror migrated residual ghost spectrum for a first reflector according to an exemplary embodiment.

Regarding the same reflector (100), the residual ghost spectrum (which is the Fourier transform of the residual ghost) is illustrated in FIG. 23 for the migrated gather and in FIG. 24 for the mirror-migrated gather. Both figures show the residual ghost spectrum (relative amplitude versus frequency) above a minimum frequency fmin having a good ghost diversity, and both curves are far from a minimum threshold TR2, which makes it possible to deconvolute the residual ghost. The same is true for the second and third reflectors 102 and 104, and for this reason their corresponding graphs are not shown here. A similar Minimum Distance to Threshold for the (s) pectrum (MDTs) of the residual ghost is introduced for the spectrum of the residual ghost, and this value may vary from survey to survey.

Figure 25:
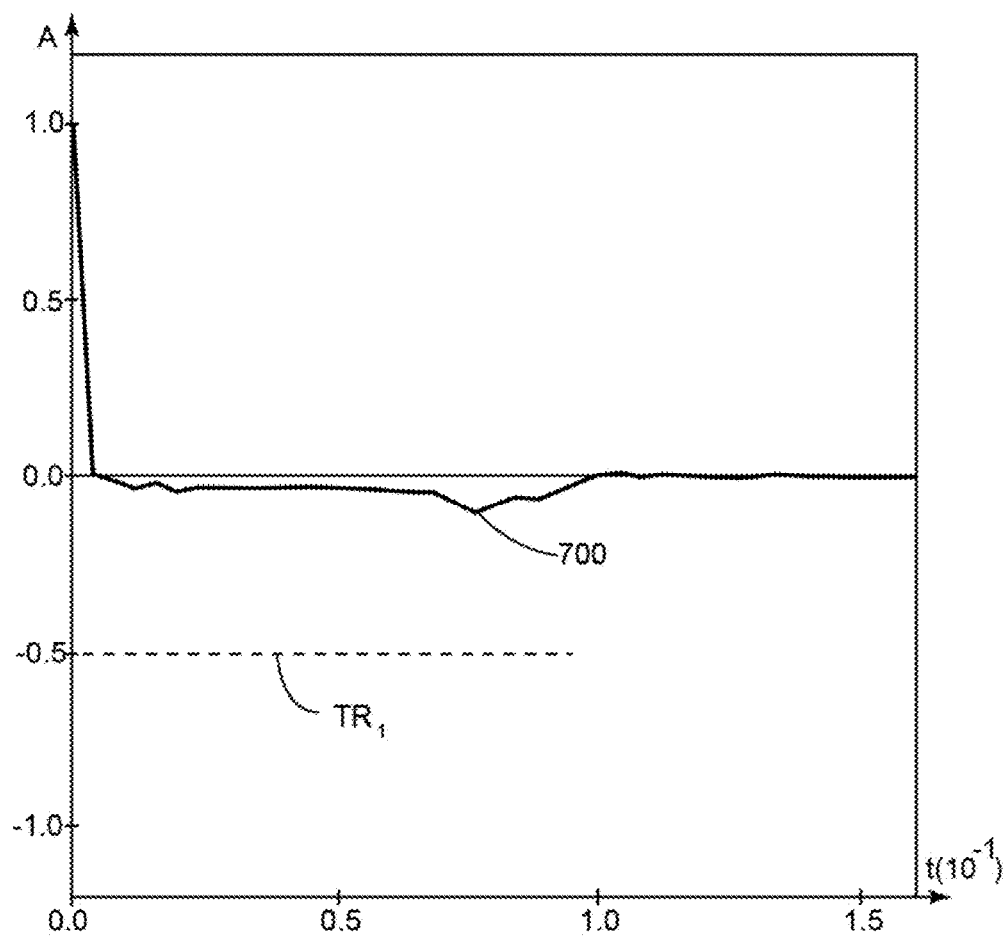
FIG. 25 illustrates a migrated residual ghost for a fourth reflector according to an exemplary embodiment.
Figure 26:
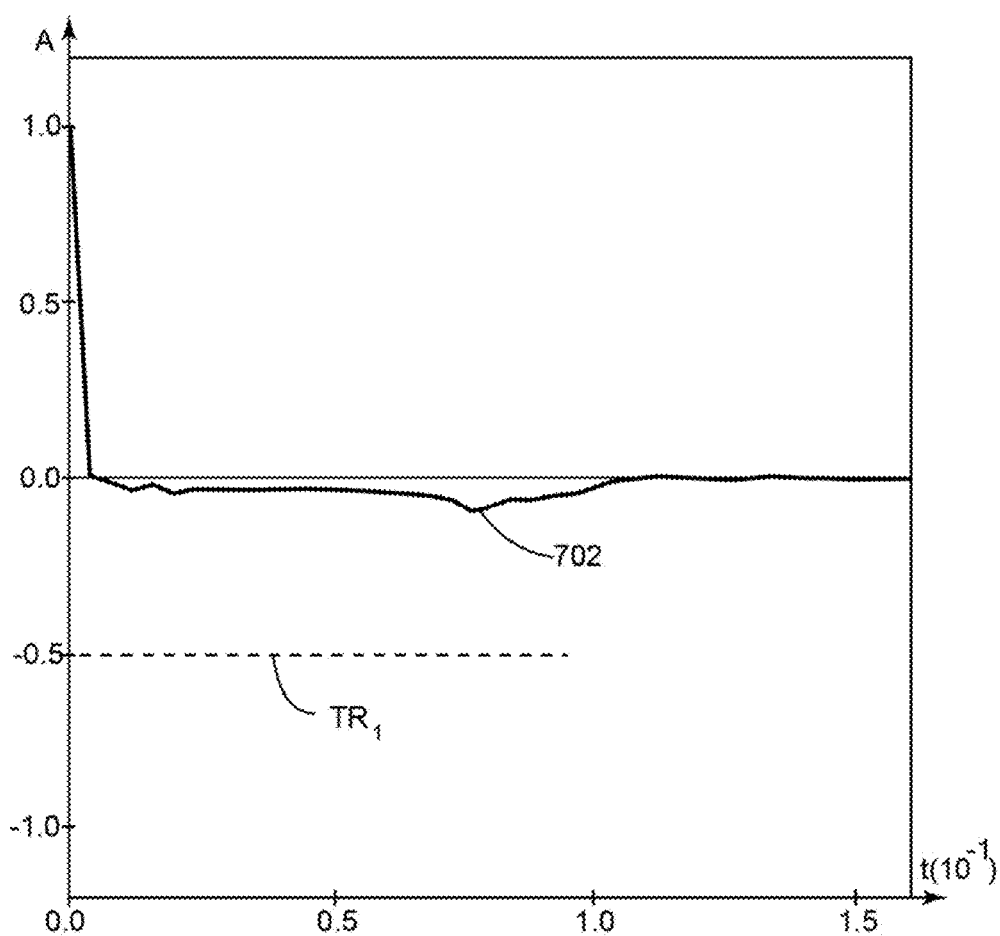
FIG. 26 illustrates a mirror migrated residual ghost for a fourth reflector according to an exemplary embodiment.
Figure 27:
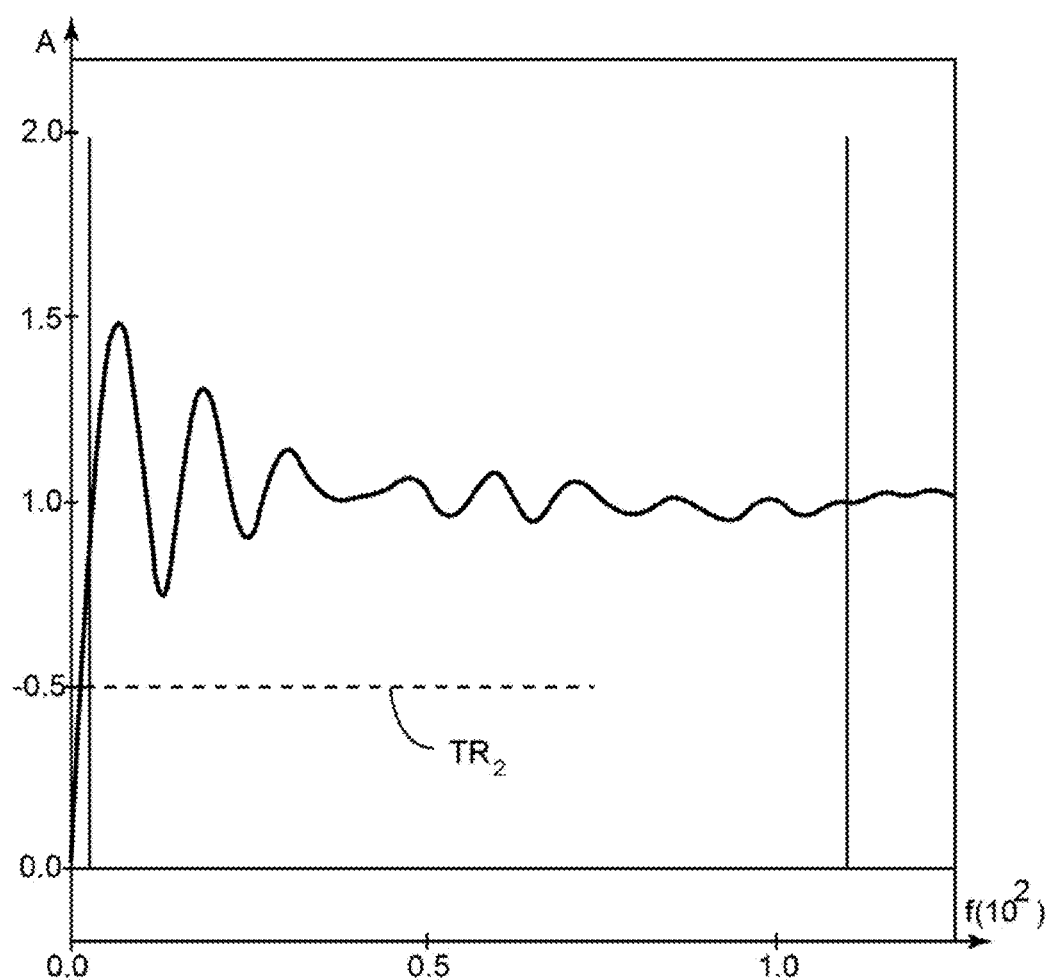
FIG. 27 illustrates a migrated residual ghost spectrum for a fourth reflector according to an exemplary embodiment.
Figure 28:
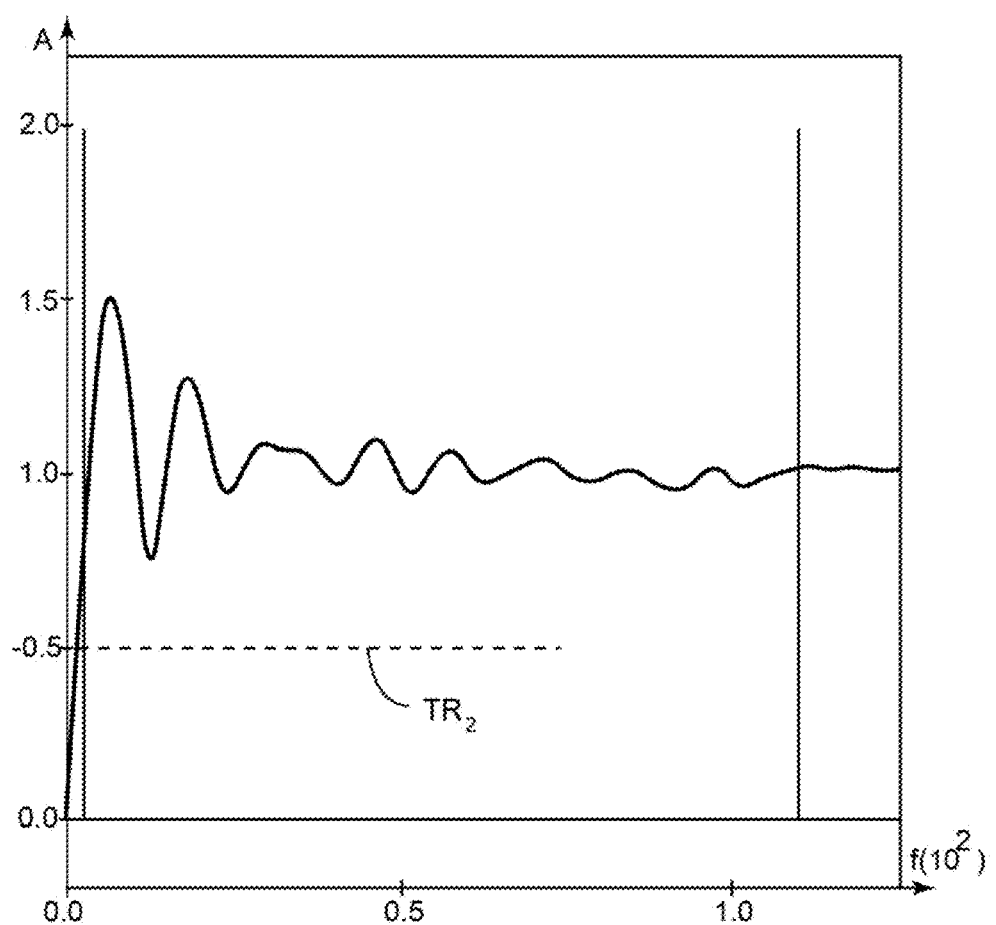
FIG. 28 illustrates a mirror migrated residual ghost spectrum for a fourth reflector according to an exemplary embodiment.

However, the situation changes for the fourth and fifth reflectors (106 and 108) as discussed and illustrated next. The residual ghost for the fourth reflector is illustrated in FIG. 25 when migration is used and in FIG. 26 when mirror-migration is used. Note that the residual ghost amplitudes do not decrease in time as for the first three reflectors, but rather have larger values later in time as indicated by 700 and 702. Also, note that the ghost's amplitude is closer to the threshold TR1, which is undesirable. This indicates that the streamer's selected curved profile might not be appropriate. However, the residual ghost spectra, illustrated in FIGS. 27 and 28, appear to still be acceptable because the oscillations of the spectrum are decreasing in time and reasonably away from the threshold TR2.

Figure 29:
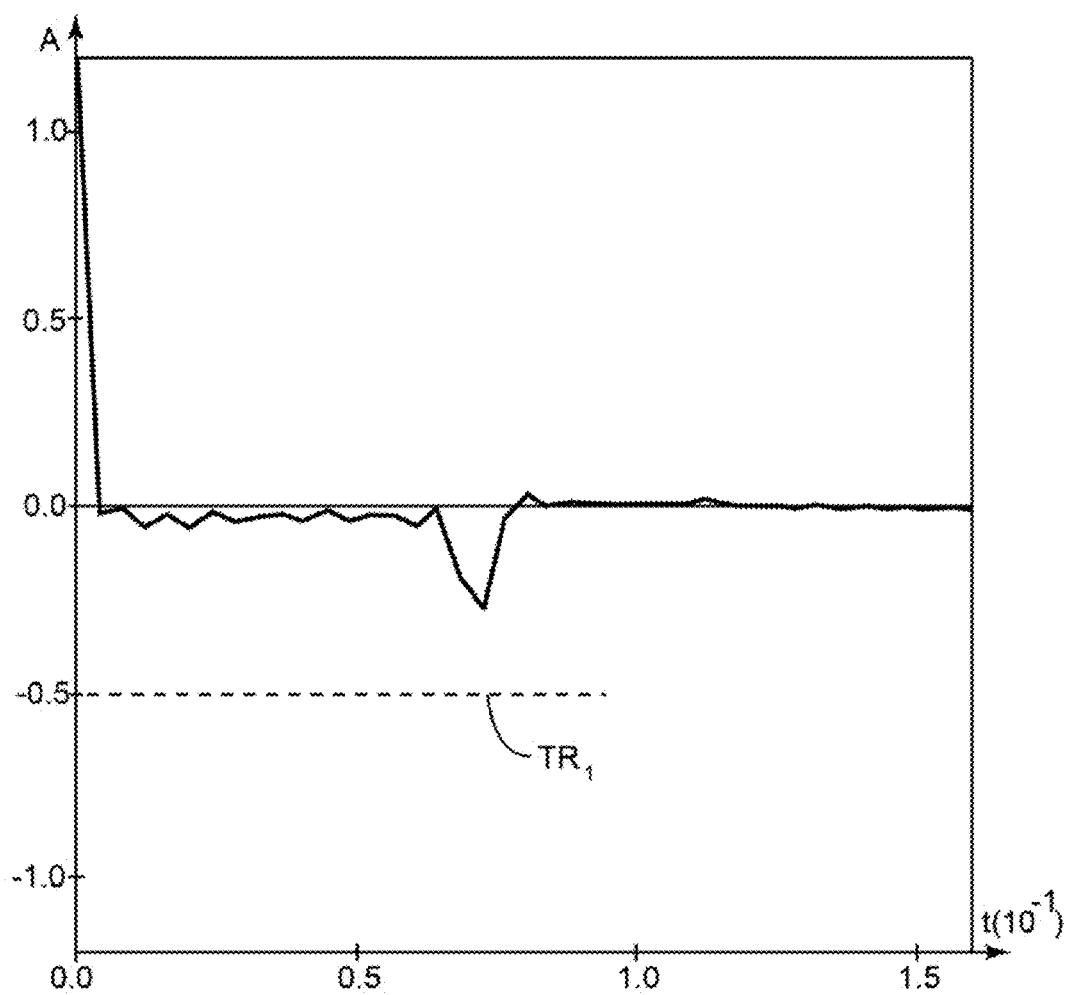
FIG. 29 illustrates a migrated residual ghost for a fifth reflector according to an exemplary embodiment.
Figure 30:
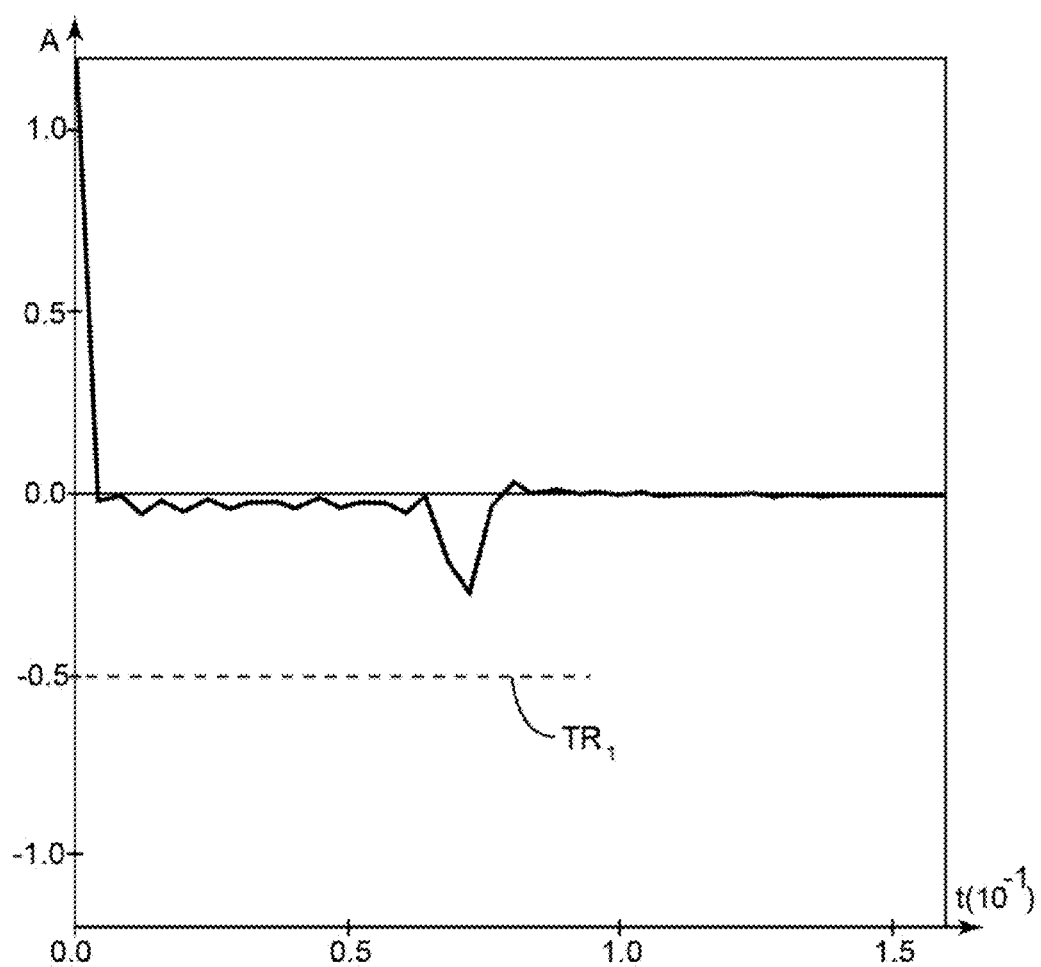
FIG. 30 illustrates a mirror migrated residual ghost for a fifth reflector according to an exemplary embodiment.
Figure 31:
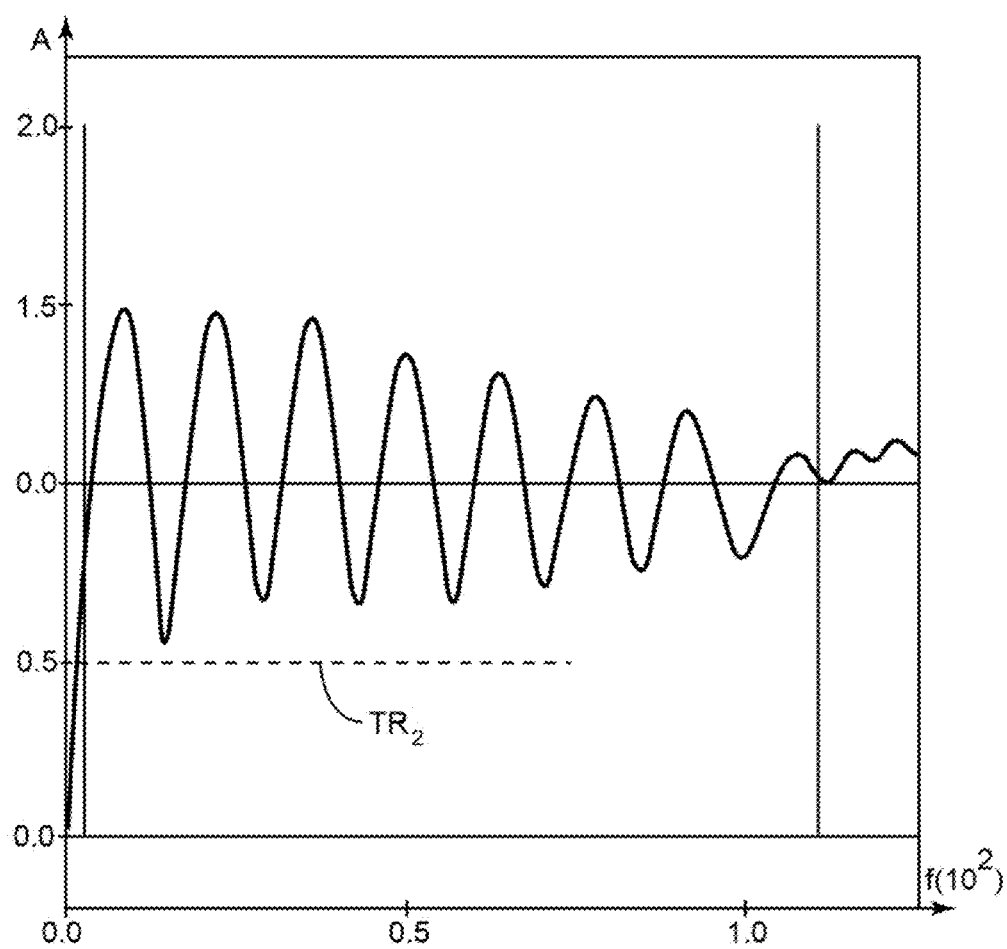
FIG. 31 illustrates a migrated residual ghost spectrum for a fifth reflector according to an exemplary embodiment.
Figure 32:
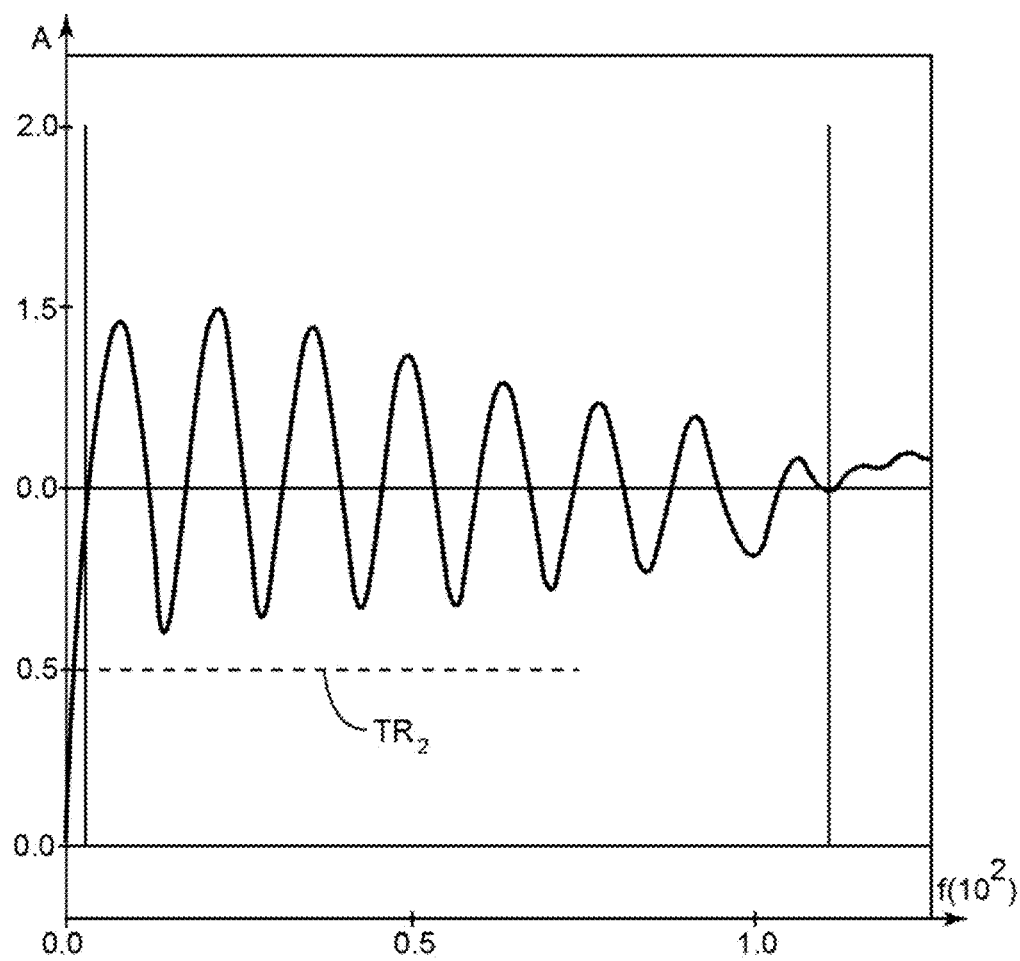
FIG. 32 illustrates a mirror migrated residual ghost spectrum for a fifth reflector according to an exemplary embodiment.

A different situation is present for the last reflector 108. FIGS. 29 and 30 show the residual ghost increasing in time (approaching the threshold TR1) and the residual ghost spectrum oscillations, illustrated in FIGS. 31 and 32, not being attenuated fast enough and almost reaching the threshold TR2, which suggest that the streamer's selected curved profile is not adequate for this last reflector. Even more, FIGS. 29-32 show that the residual ghost and residual ghost spectra approach their thresholds TR1 and TR2 (i.e., MDTr and MDTs are small), which is a further indication that the streamer's selected profile is inappropriate for this reflector. However, because this last reflector is outside the zone of interest of the survey and also the farthest from it, the system operator may decide to keep the streamer's selected profile if the residual ghost and residual ghost spectrum for the reflectors of interest are appropriate.

Having the information shown in FIGS. 15-32, the operator needs to decide whether the selected profile is appropriate for surveying the desired subsurface. For the particular example discussed in FIGS. 15-32, there are two possibilities. Because the last reflector 108 has a depth of around 10 km as shown in FIG. 11, it is likely that this reflector might not be important in determining the final image of the desired subsurface because this depth is too deep for drilling. If this is the case, the operator may discard the data shown in FIGS. 29-32 and decide that the selected curved profile is appropriate for the given seismic survey and may provide in step 912 the curved profile's parameters to the seismic survey operator to shape the streamers appropriately.

However if the last reflector is important, the process returns to step 904 and a new curved profile is chosen for the streamer, after which steps 902 to 910 are repeated. These steps may be repeated until an appropriate profile for the streamer is found.

With regard to step 910, note that multiple criteria may be used to evaluate/determine whether a selected profile is appropriate for a given survey. One criterion may be the ghost's slope over various ranges in the inline direction. Another criterion is the closeness (e.g., MDTr) of the residual ghost to a predetermined value, i.e., TR1. Still another criterion is the closeness (e.g., MDTs) of the residual ghost spectrum to a predetermined threshold TR2. The predetermined value and/or threshold may be related to each other, and may vary from survey to survey. The predetermined value and/or threshold may be related to noise in the recorded seismic data and indicate that, if the residual ghost is close to the threshold, its accuracy is compromised. As noted above, these criteria may be applied to all or fewer of the selected reflectors.

In one exemplary embodiment, the method relies only on one of the above-noted criteria, or on a combination of two or more. If more than one criterion is used, they may be weighted to provide the final decision. Various methods are known in the art for using multiple criteria for determining whether a result is acceptable or not.

Still with regard to step 910, note that a set of predetermined curves (e.g., similar to those shown in FIGS. 21-24), both for the residual ghost and the residual ghost spectrum, may be selected as the benchmark for deciding whether the results for a selected streamer are correct. If this is the case, the computer, after calculating the residual ghost and/or the residual ghost spectrum as described in step 908, compares the results with the predetermined curves noted above and determines whether the streamer's selected shape is appropriate or not. In another case, after calculating the residual ghost and/or the residual ghost spectrum, their graphs are compared to benchmark residual ghosts and residual ghost spectra for acceptance or rejection.

Alternatively, while the figures showing the primaries and ghosts were helpful in understanding this method, note that it does not need to show those characteristics. What is needed to select the appropriate streamer's profile is that the operator determines the residual ghost and/or residual ghost spectrum and determines, for various selected reflectors, whether the residual ghost decreases and/or the residual ghost spectra are far enough from corresponding thresholds. In this last respect, note that the residual ghost spectrum's slope is proportional to the average receiver depth relative to the water's surface. Thus, a decreasing residual ghost spectrum, as shown for example in FIG. 27, indicates that the last receivers on the streamer lie at a flat depth, which matches the geometry of the streamer shown for example in FIG. 4. However, the residual ghost spectrum of FIG. 31 indicates that the last receivers on the streamer are not at a flat depth, which makes impractical the geometry shown in FIG. 4.

The streamer's variable-depth profile was determined above by computing the gathers after stacking. However, it is possible to calculate the gathers in step 906 of FIG. 9 before stacking and to use these gathers to choose the profile that produces the seismic data with the best ghost diversity at all offsets.

The processes and methods discussed above may be implemented by a processor, computer or another computing device. Steps of these methods may be implemented with software.

Figure 33:
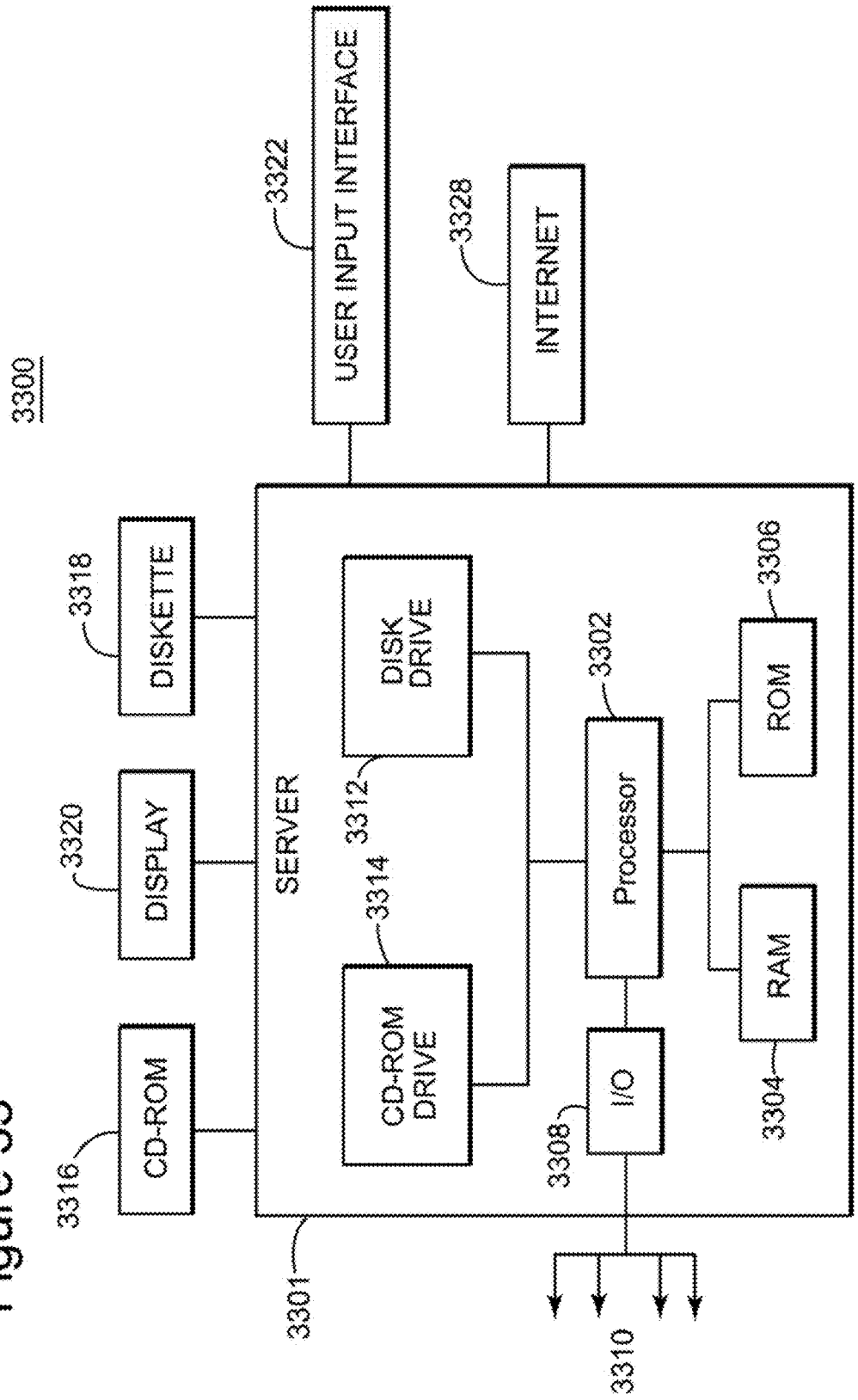
FIG. 33 is a schematic diagram of a computing device for calculating a shape of a marine streamer.

An example of a representative computing device capable of carrying out operations in accordance with the exemplary embodiments is illustrated in FIG. 33. The exemplary computing device 3300 suitable for performing the activities described in the exemplary embodiments may include a server 3301. Such a server 3301 may include a central processor (CPU) 3302 coupled to a random access memory (RAM) 3304 and to a read-only memory (ROM) 3306. The ROM 3306 may also be other types of storage media to store programs, such as programmable ROM (PROM), erasable PROM (EPROM), etc. The processor 3302 may communicate with other internal and external components through input/output (I/O) circuitry 3308 and bussing 3310, to provide control signals and the like. The processor 3302 carries out a variety of functions as are known in the art, as dictated by software and/or firmware instructions.

The server 3301 may also include one or more data storage devices, including hard disk drives 3312, CD-ROM drives 3314, and other hardware capable of reading and/or storing information such as DVD, etc. In one embodiment, software for carrying out the above-discussed steps may be stored and distributed on a CD-ROM 3316, removable media 3318 or other form of media capable of portably storing information. These storage media may be inserted into, and read by, devices such as the CD-ROM drive 3314, the disk drive 3312, etc. The server 3301 may be coupled to a display 3320, which may be any type of known display or presentation screen, such as LCD, LED, plasma display, cathode ray tubes (CRT), etc. A user input interface 3322 is provided, including one or more user interface mechanisms such as a mouse, keyboard, microphone, touchpad, touch screen, voice-recognition system, etc.

The server 3301 may be coupled to other computing devices, such as a landline and/or wireless terminals and associated watcher applications, via a network. The server may be part of a larger network configuration as in a global area network (GAN) such as the Internet 3328, which allows ultimate connection to the various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such a floppy disk or magnetic tape. Other non-limiting examples of computer-readable media include flash-type memories or other known memories.

The disclosed exemplary embodiments provide a method for determining a shape of a streamer for seismic data acquisition. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A signal generation device comprising:
   a spool;
   a flexible printed circuit board which surrounds the spool;
   a reference signal generation unit which is disposed on the flexible printed circuit board to generate a reference signal;
   an ultrasonic wave generation unit which surrounds the spool and is in contact with a contact electrode formed on the flexible printed circuit board to be supplied with power to generate an ultrasonic signal, wherein the contact electrode is formed in an area having the same height as that of the reference signal generation unit;
   wherein the flexible printed circuit board includes a main portion which surrounds the spool and a sub portion which is extended from the main portion in a vertical direction; and
   wherein the contact electrode is formed in an area of the main portion where the main portion and the sub portion are connected.

2. The method of claim 1, wherein the at least one criterion is a minimum distance (MDTr) between the residual ghost and a first predetermined threshold (TR1).

3. The method of claim 2, wherein the at least one criterion is met when the minimum distance (MDTr) is smaller than a first predetermined value.

4. The method of claim 1, wherein the at least one criterion is a minimum distance (MDTs) between the residual ghost spectrum and a second predetermined threshold (TR2).

5. The method of claim 4, wherein the at least one criterion is met when the minimum distance (MDTs) is smaller than a second predetermined value.

6. The method of claim 1, wherein the at least one criterion is a slope of the ghost for a given length range.

7. The method of claim 6, wherein the at least one criterion is met when slopes of the ghosts corresponding to given length ranges are above a threshold slope.

8. The method of claim 1, further comprising:
   calculating, in a processor, a shot point for the plural reflectors based on the velocity model and the first profile of the streamer; and
   calculating, for the plural reflectors, corresponding residual ghosts and/or residual ghost spectra based on the shot point.

9. The method of claim 1, further comprising:
   selecting a second profile for the streamer when the at least one criterion is not met;
   recalculating the residual ghosts and/or the residual ghost spectra for the plurality of the reflectors based on the second profile of the streamer; and
   determining whether the second profile is appropriate.

10. The method of claim 1, wherein the residual ghost is calculated in a post-stack phase.

11. The method of claim 1, wherein the residual ghost is calculated in a pre-stack phase.

12. The method of claim 1, wherein the first profile is a variable-depth profile.

13. The method of claim 1, wherein the first profile is a parameterized curve.

14. A computing device programmed for determining a shape of a streamer to be towed underwater for collecting seismic data regarding a subsurface, the computing device comprising:
   an interface configured to receive a velocity model for the subsurface; and
   a processor connected to the interface and configured to,
   select a first profile for the streamer to be used to survey the subsurface,
   select plural reflectors of the subsurface,
   calculate ghosts and/or residual ghosts and/or residual ghost spectra for the plurality of the reflectors, and
   determine that the first profile is appropriate for surveying the subsurface when at least one criterion, related to the ghosts, and/or the residual ghosts and/or the residual ghost spectra, is met.

15. The computing device of claim 14, wherein the at least one criterion is a minimum distance (MDTr) between the residual ghost and a first predetermined threshold (TR1), or a minimum distance (MDTs) between the residual ghost spectrum and a second predetermined threshold (TR2), or slopes of the ghosts corresponding to given length ranges.

16. The computing device of claim 14, wherein the processor is further configured to:
   calculate a shot point for the plural reflectors based on the velocity model and the first profile of the streamer;
   calculate, for the plural reflectors, corresponding residual ghosts and/or residual ghost spectra based on the shot point;
   select a second profile for the streamer when the at least one criterion is not met;
   recalculate the residual ghosts and/or the residual ghost spectra for the plurality of the reflectors based on the second profile of the streamer; and
   determine whether the second profile is appropriate.

17. An article comprising at least one computer-readable storage medium containing instructions that when executed causes a computer to:
   receive a velocity model for the subsurface;
   select a first profile for the streamer to be used to survey the subsurface;
   select plural reflectors of the subsurface;
   calculate ghosts and/or residual ghosts and/or residual ghost spectra for the plurality of the reflectors; and
   determine that the first profile is appropriate for surveying the subsurface when at least one criterion, related to the ghosts, and/or the residual ghosts and/or the residual ghost spectra, is met.

18. The article of claim 17, wherein the at least one criterion is a minimum distance (MDTr) between the residual ghost and a first predetermined threshold (TR1).

19. The article of claim 18, wherein the at least one criterion is met when the minimum distance (MDTr) is smaller than a first predetermined value.

20. The article of claim 17, wherein the at least one criterion is a minimum distance (MDTs) between the residual ghost spectrum and a second predetermined threshold (TR2).

21. The article of claim 20, wherein the at least one criterion is met when the minimum distance (MDTs) is smaller than a second predetermined value.

22. The article of claim 17, wherein the at least one criterion is a slope of the ghost for a given length range.

23. The article of claim 22, wherein the at least one criterion is met when slopes of the ghosts corresponding to given length ranges are above a threshold slope.

* * * * *

UNITED STATES PATENT AND TRADEMARK OFFICE
CERTIFICATE OF CORRECTION

PATENT NO. : 10,459,099 B2
APPLICATION NO. : 13/606601
DATED : October 29, 2019
INVENTOR(S) : Robert Soubaras Page 1 of 1

It is certified that error appears in the above-identified patent and that said Letters Patent is hereby corrected as shown below:

In the Claims

In Column 15, Lines 15-33, please delete:
"1. A signal generation device comprising:
a spool;
a flexible printed circuit board which surrounds the spool;
a reference signal generation unit which is disposed on the flexible printed circuit board to generate a reference signal;
an ultrasonic wave generation unit which surrounds the pool and is in contact with a contact electrode formed on the flexible printed circuit board to be supplied with power to generate an ultrasonic signal, wherein the contact electrode is formed in an area having the same height as that of the reference signal generation unit;
wherein the flexible printed circuit board includes a main portion which surrounds the spool and a sub portion which is extended from the main portion in a vertical direction;
  and wherein the contact electrode is formed in an area of the main portion where the main portion and the sub portion are connected."

And insert:
-- 1. A method for determining a shape of a streamer to be towed underwater for collecting seismic data regarding a subsurface, the method comprising:
receiving a velocity model for the subsurface;
selecting a first profile for the streamer to be used to survey the subsurface;
selecting plural reflectors of the subsurface;
calculating ghosts and/or residual ghosts and/or residual ghost spectra for the plurality of the reflectors; and
determining that the first profile is appropriate for surveying the subsurface when at least one criterion, related to the ghosts, and/or the residual ghosts and/or the residual ghost spectra, is met. --, therefor.

Signed and Sealed this
Thirty-first Day of December, 2019

Andrei Iancu
*Director of the United States Patent and Trademark Office*